US011824961B1

(12) United States Patent
Wei et al.

(10) Patent No.: US 11,824,961 B1
(45) Date of Patent: Nov. 21, 2023

(54) INDEPENDENT TRANSPORT CONTROL PROTOCOL (TCP) THROUGHPUT MEASUREMENT ON A CLIENT DEVICE

(71) Applicant: Amazon Technologies, Inc., Seattle, WA (US)

(72) Inventors: QingYun Wei, San Jose, CA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 17/157,426

(22) Filed: Jan. 25, 2021

(51) Int. Cl.
| | |
|---|---|
| *H04L 69/16* | (2022.01) |
| *H04L 69/22* | (2022.01) |
| *H04W 24/08* | (2009.01) |
| *H04L 61/5007* | (2022.01) |
| *H04W 84/12* | (2009.01) |
| *H04L 101/622* | (2022.01) |

(52) U.S. Cl.
CPC ........ *H04L 69/161* (2013.01); *H04L 61/5007* (2022.05); *H04L 69/22* (2013.01); *H04W 24/08* (2013.01); *H04L 2101/622* (2022.05); *H04W 84/12* (2013.01)

(58) Field of Classification Search
CPC ... H04L 69/161; H04L 69/22; H04L 61/5007; H04L 2101/622; H04W 24/08; H04W 84/12
See application file for complete search history.

(56) References Cited

FOREIGN PATENT DOCUMENTS

| CA | 2683120 A1 | * | 11/2008 | ........ H04W 52/0216 |
| CA | 3062272 A1 | * | 10/2018 | ............. H04L 45/24 |
| CN | 107529185 A | * | 12/2017 | ........... H04L 43/045 |
| KR | 101775325 B1 | * | 9/2017 | |

* cited by examiner

*Primary Examiner* — Saad A. Waqas
(74) *Attorney, Agent, or Firm* — Lowenstein Sandler LLP

(57) ABSTRACT

Technologies directed to determining a TCP throughput of one or more communication links between two or more devices of a LAN. One method includes a first device that generates a second data packet from a first data packet by modifying a destination address field to be the same as a source address field. The first device sends the second data packet to the second device and receives a third data packet in response. The third data packet specifies the address of the first device in a destination address field and a source address field. The first device generates a fourth data packet from the third data packet by modifying data in the source address field to specify the address of the second device and determines a first value indicative of TCP throughput of a first communication link between the first device and the second device.

18 Claims, 14 Drawing Sheets

INDEPENDENT TRANSPORT CONTROL PROTOCOL (TCP) THROUGHPUT MEASUREMENT ON A CLIENT DEVICE

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
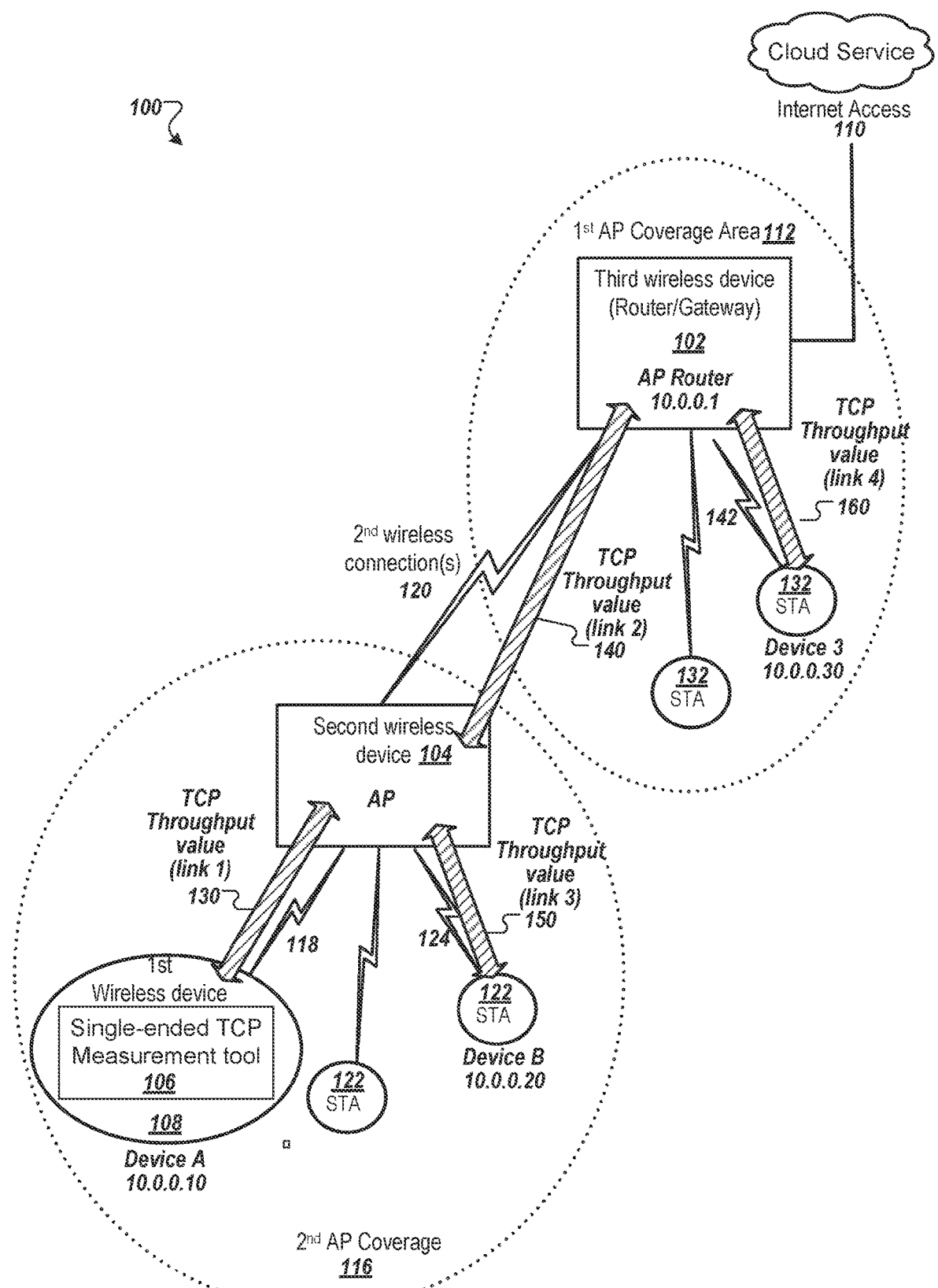
FIG. 1 is a network diagram of a wireless network with a first wireless device with a single-ended Transport Control Protocol (TCP) measurement tool for measuring a TCP throughput of one or more communication links in the wireless network according to one embodiment.

Technologies directed to determining a TCP throughput of one or more communication links between two or more devices of a LAN. TCP throughput, which is also referred to herein as TCP round-trip throughput or as speed over TCP, is one of the most important metrics to measure and quantify wireless local area network (WLAN) (e.g., Wi-Fi®) performance and LAN (e.g., Ethernet) network performance. This is a result of application layer protocols and infrastructures like HyperText Transport Protocol (HTTP) and web services are built on top of TCP. As such, TCP throughput directly affects the user experience that the WLAN/LAN/Ethernet network can provide. As more and more Wi-Fi® enabled multimedia devices, Internet of Things (IoT) devices, and smart home products are deployed to an end user's residential network, the normal residential home network becomes more complicated. When a device encounters connectivity issues and has trouble accessing a local network or Internet cloud services, the device cannot intelligently and independently detect which communication links among the home network nodes (access point (AP), AP router, or cloud service) are not working properly and causing unreliable TCP performance. Conventionally, to measure TCP throughput between two devices over the local home network, a user needs to set up special instrument agents on both of the devices. This is possible when the devices are computers or smart mobile products on which applications can be installed that communicate with one or another to measure TCP throughput. This can be challenging for IoT and smart home devices from different manufacturers and with limited resources. As such, installing speed test tools on all devices in a wireless network to measure TCP throughput among the devices is not feasible.

Aspects of the present disclosure address the above and other deficiencies of measuring TCP throughput (also referred to as TCP round-trip throughput) by providing a single-ended TCP measurement tool that can measure a value indicative of TCP throughput between two devices over one or more communication links in a wireless network. Embodiments of the single-ended TCP measurement tool can intelligently and independently detect which communication links among the home network nodes (e.g., AP, AP router, local server, or cloud services) are not working properly and causing unreliable TCP performance. In at least one embodiment, one method includes a first device generates an original outgoing TCP packet (e.g., a first data packet) with a payload, the first data packet specifying an address of a second device in a destination address field and an address of the first device in a source address field and generates a transformed outgoing TCP packet (e.g., a second data packet) from the first data packet by modifying data in the destination address field to be the same as the source address field. The first device sends the second data packet to the second device and receives an original incoming TCP packet (e.g., a third data packet) in response. The third data packet specifies the address of the first device in a destination address field and a source address field. The first device generates a transformed incoming TCP packet (e.g., a fourth data packet) from the third data packet by modifying data in the source address field to specify the address of the second device and determines a first value indicative of TCP throughput of a first communication link between the first device and the second device. Embodiments of the single-ended TCP measurement tool can be used to adjust accordingly to recover from failure or provide useful and accurate information to assist a user to fix the network problems. Embodiments of the single-ended TCP measurement tool can measure a value indicative of TCP throughput between two devices over the local home network without special instrument agents on both devices or any intervening devices.

Embodiments of the single-ended TCP measurement tool allow a wireless device to independently measure TCP performance between itself and an AP, an AP router, or other local nodes without requiring special TCP testing components on peer nodes. Embodiments of the single-ended TCP measurement tool can quantify the performance of the end user's home network and generate a set of scores for each network path. The network scores can be leveraged for health monitoring, performance diagnosis, auto-recovery, and user recommendation for troubleshooting. Embodiments of the single-ended TCP measurement tool can use any combination of a layer 2 approach, a layer 3 approach, or a layer 4 approach depending on which communication link is being tested as described below in more detail.

FIG. 1 is a network diagram of a wireless network 100 with a first wireless device 108 with a single-ended TCP measurement tool 106 for measuring a TCP throughput of one or more communication links in wireless network 100 according to one embodiment. Wireless network 100 includes multiple devices, including first wireless device 108, second wireless device 104, which is an access point (AP) for first wireless device 108, and zero or more endpoint devices 122 (also referred to herein as stations (STAs). Wireless network 100 also includes a third wireless device 102, which provides backhaul connectivity to wireless network 100, such as using a wired or wireless connection 110 to the Internet. For example, third wireless device 102 can be connected to a gateway or a modem via wired or wireless connection 110. Alternatively, third wireless device 102 can be a router or a gateway and can provide internet access to second wireless device 104 and first wireless device 108 described below. Although both second wireless device 104 and third wireless device 102 operate as APs, only third wireless device 102 is an AP router that provides Internet access (connection 110). In another embodiment, other AP devices can provide Internet access. Third wireless device 102 can provide a first AP to wireless devices, such as endpoint devices 132, in a first AP coverage area 112 on a first channel. One or more endpoint devices 132 can also be referred to as client devices or stations (STAs). Third wireless device 102 can also provide backhaul to one or more AP devices, such as second wireless device 104. Second wireless device 104 can establish a second wireless connection 120 with third wireless device 102. Second wireless device 104 can provide a second AP to wireless devices, such as first wireless device 108 and zero or more other endpoint devices 122 in a second AP coverage area 116. First wireless device 108 can establish a first wireless connection 118 with second wireless device 104. Second wireless device 104 can establish one or more additional wireless connections with the one or more endpoint devices 122. For example, a fourth wireless device 122 can establish a third wireless connection 124 with second wireless device 104. First wireless device 108 and endpoint devices 122 can each be a computer, a smartphone, a voice-controlled device, a wireless display, a wireless speaker, a game console, a wireless gamepad, or the like. In some cases, a primary radio is used to connect second wireless device 104 to third wireless device 102, for internet access and a secondary radio is used to create a second AP for connecting endpoint devices 122. Both radios can operate in the same band or separate bands. Alternatively, a single radio can be used for both wireless connections. Third wireless device 102 and second wireless device 104 can provide first AP and second AP, respectively, using the same channel or adjacent channels. Third wireless device 102 can establish one or more additional wireless connections with the one or more endpoint devices 132. For example, a fifth wireless device 122 can establish a fourth wireless connection 142 with third wireless device 102. Alternatively, wireless network 100 can include more or fewer devices as illustrated in FIG. 1.

During operation, in at least one embodiment, a processor of first wireless device 108 executes a TCP/IP stack and a network device driver, such as a WLAN device driver or a LAN driver. In addition to the TCP/IP stack and network device driver, first wireless device 108 executes a single-ended TCP measurement tool 106, including a TX transformer and RX transformer, which are described in more detail below.

In at least one embodiment, single-ended TCP measurement tool 106 can perform one or more operations to determine TCP throughput for one or more communication links in wireless network 100. In at least one embodiment, TCP measurement generates a TCP payload as part of an operation to measure a value indicative of TCP throughput of one or more communication links in wireless network 100, such as a first TCP throughput value 130 of a first communication link between the first wireless device 108 and second wireless device 104, a second TCP throughput value 140 between second wireless device 104 and third wireless device 102, a third TCP throughput value 150 between second wireless device 104 and a fourth wireless device 122, or a fourth TCP throughput value 160 between third wireless device 102 and a fifth wireless device 132. In at least one embodiment, single-ended TCP measurement tool 106 can also generate values indicative of TCP throughput of a path between two devices, such as a first path between first wireless device 108 and third wireless device 102, including first TCP throughput value 130 and second TCP throughput value 140. In another embodiment, single-ended TCP measurement tool 106 can generate a value indicative of TCP throughput of a second path between first wireless device 108 and fourth wireless device 122, including first TCP throughput value 130 and third TCP throughput value 150. In another embodiment, single-ended TCP measurement tool 106 can generate a value indicative of TCP throughput of a third path between first wireless device 108 and fifth wireless device 132, including first TCP throughput value 130, second TCP throughput value 140, and fourth TCP throughput value 160.

In at least one embodiment, single-ended TCP measurement tool 106 includes a client component, such as an iperf TCP client, a server component, an iperf TCP server, a TX transformer, and an RX transformer, as described in more detail below. Single-ended TCP measurement tool 106 works in conjunction using the TCP/IP stack and network device driver to generate, send and receive data packets to measure values of TCP throughput. Single-ended TCP measurement tool 106 can implement one or more of the following approaches, including a layer 2 approach described below with respect to FIGS. 3A-3B, a layer 3 approach described below with respect to FIGS. 4A-4B, and a layer 4 approach described below with respect to FIGS. 5A-5B. Iperf TCP server of single-ended TCP measurement tool 106 can be configured to listen on a destination port of the data packets in a first direction of a communication link being evaluated and iperf TCP client of single-ended TCP measurement tool 106 can be configured to listen on a source port of the data packets in a second direction of the link being evaluated.

For ease of description, first wireless device 108 is referred to as Device A 108 and has an example address of 10.0.0.10, second wireless device 104 is referred to as AP 104, and third wireless device 102 is referred to as AP router 102 and has an example address of 10.0.0.1. Also, fourth device 122 is referred to as Device B 122 and has an example address of 10.0.0.20, and fifth device 132 is referred to as Device C 132 and has an example address of 10.0.0.30.

As illustrated in FIG. 1, Device A 108 needs access to a cloud service from wireless network 100 (e.g., a home network) and there are the following network links and paths from the perspective of Device A 108: Link 1 between Device A 108 and AP 104 (the AP that Device A 108 is directly associated with); Path 1 between Device A 108 and AP router 102 (that is used as default gateway by devices on wireless network 100); Path 2 between Device A 108 and Device B 122; Path 3 between Device A 108 and Device C 132; and Path 4 between Device A 108 and Internet cloud service. It should be noted that Link 2 is a 2-hop path (or 2-link path), including Link 1 and Link 2 between AP 104 and AP router 102. It should also be noted that additional paths between Device A 108 and other devices on the same network can be determined. Depending on network topology, the paths can go through L2 AP (for Device B) or L3 router (for Device C). Path 4 can be a multi-link path that includes local paths (Link 1 and Link 2) and the Internet path.

In at least one embodiment, Device A 108 measures the TCP throughput over local links 1-3 and paths. Since there are no special instrumental TCP endpoints on other local nodes, Device A 108 can uses one or more of the L2, L3, and L4 approaches described herein to measure TCP loopback performance over those local links and paths. The idea is that Device A 108 sends TCP packets to a target local node, and if the target node can echo the TCP packets back, Device A 108 can measure a native round-trip TCP throughput between itself and the target node. As described herein, at different network layers, three mechanisms can be leveraged to implement the loopback testing: Layer 2 bridging, hairpin bridging as described below with respect to FIGS. 2-3B; Layer 3 routing, hairpin routing (also referred to as packet switching and packet forwarding) as described below with respect to FIGS. 4A-4B; and Layer 4 Internet Control Message Protocol (ICMP), PING ECHO request/reply as described below with respect to FIGS. 5A-5B. Any one or more of these approaches can be used to implement independent TCP throughput measurements of one or more links or one or more paths of wireless network 100.

Referring back to FIG. 1, in at least one embodiment, Device A 108 can determine a first TCP throughput value 130 indicative of TCP throughput of a first link between Device A 108 as a first device and AP 104 as a second device. In at least one embodiment, AP 104 is a bridge device. A bridge device is a device that has multiple ports or interfaces (WLAN AP or mesh interfaces) and maintains a switch table to specify which device a media access control (MAC) address (MAC) addresses are reachable via which port or interface. When the bridge device (e.g., 104) receives an L2 packet from an interface, using the packet's destination MAC address, it looks up the switch table to decide which interface/port the packet should be forwarded to, such as illustrated in the internal switch table 202 of the L2 AP 104 of FIG. 2.

Figure 2:
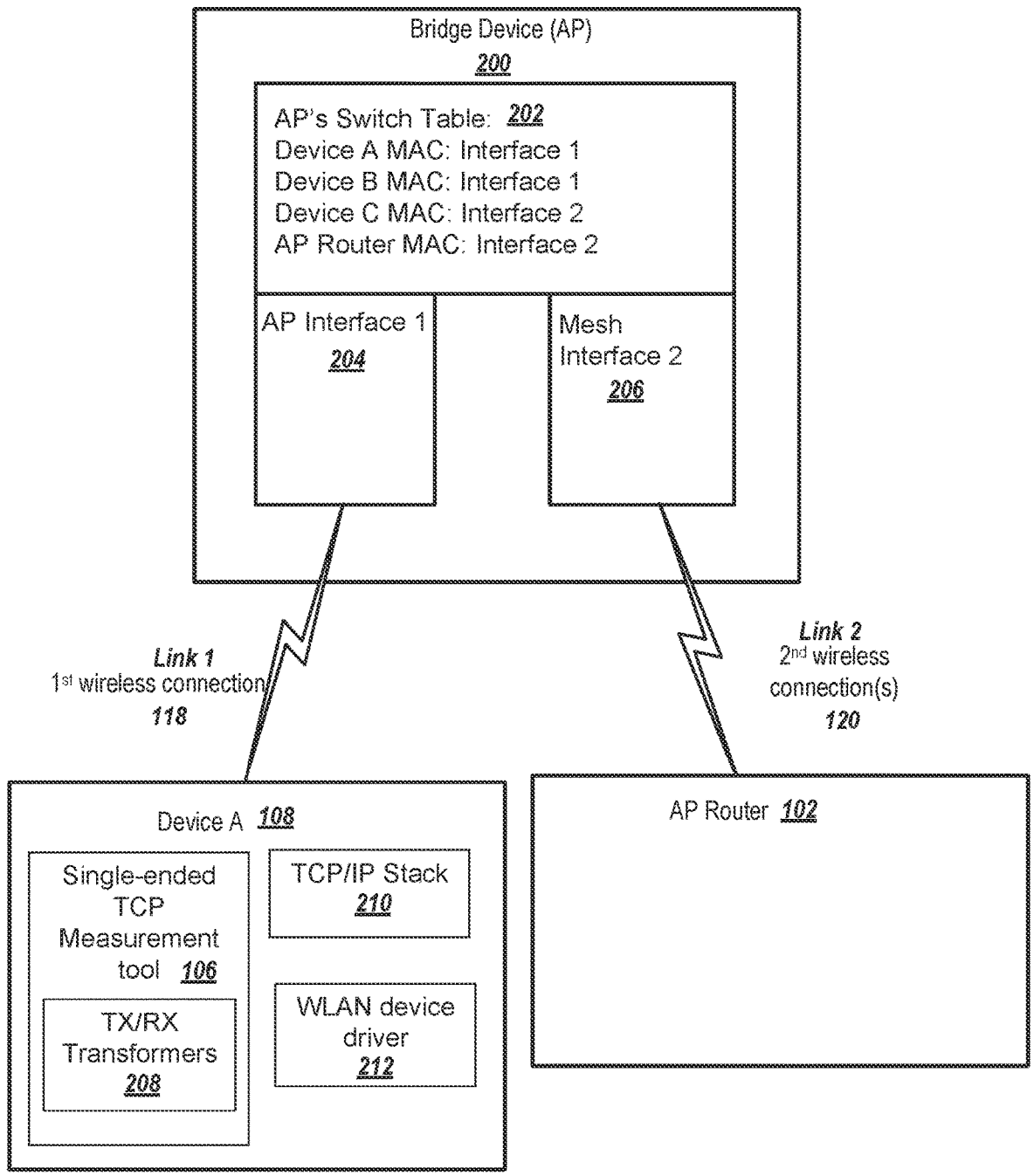
FIG. 2 is a network diagram of a first wireless device communicatively coupled with a bridge device according to one embodiment.

FIG. 2 is a network diagram of a first wireless device 108 communicatively coupled with a bridge device 200 according to one embodiment. Bridge device 200 includes a switch table 202 and two interfaces: first interface 204 and second interface 206. First interface 204 is an AP interface connected to Device A 108 and device B 122 (not illustrated in FIG. 2). Second interface 206 is a mesh interface that has an established mesh link connected to a root AP router 102. It should also be noted that device C 132 is reachable through this mesh interface. Bridge device 200 supports hairpin bridging, which means that from an interface, bridge device 200 receives a data packet whose destination and source MAC addresses are the same, bridge device 200 will send the data packet back to an incoming interface. For example, bridge device 200 receives a data packet from Device A 108 via first interface 204, the data packet specifying the same destination and source MAC addresses, bridge device 200 sends the data packet back to Device A 108 via first interface 204. Single-ended TCP measurement tool 106 can use the hairpin bridging of bridge device 200 to conduct operations to measure TCP loopback performance over a direct link between Device A 108 and AP 104 over a first link (link 1). Example packet process flows are illustrated below with respect to FIGS. 3A-3B.

As illustrated in FIG. 2, Device A 108 includes TCP/IP stack 210 and WLAN device driver 212. TCP/IP stack 210 is processing logic that generates and formats data packets according to a set of communication protocols for communications with another device. WLAN device driver 212 is a network device driver that generates and formats data packets to be transmitted by a radio of a device. Single-ended TCP measurement tool 106 can include a TX transformer and RX transformer 208. TX/RX transformers 208 can be used in connection with TCP/IP stack 210 and WLAN device driver 212 to implement the L2 approach as set forth in FIGS. 3A-3B, the L3 approach as set forth in FIGS. 4A-4B, and the L4 approach as set forth in FIGS. 5A-5B.

Figure 3A:
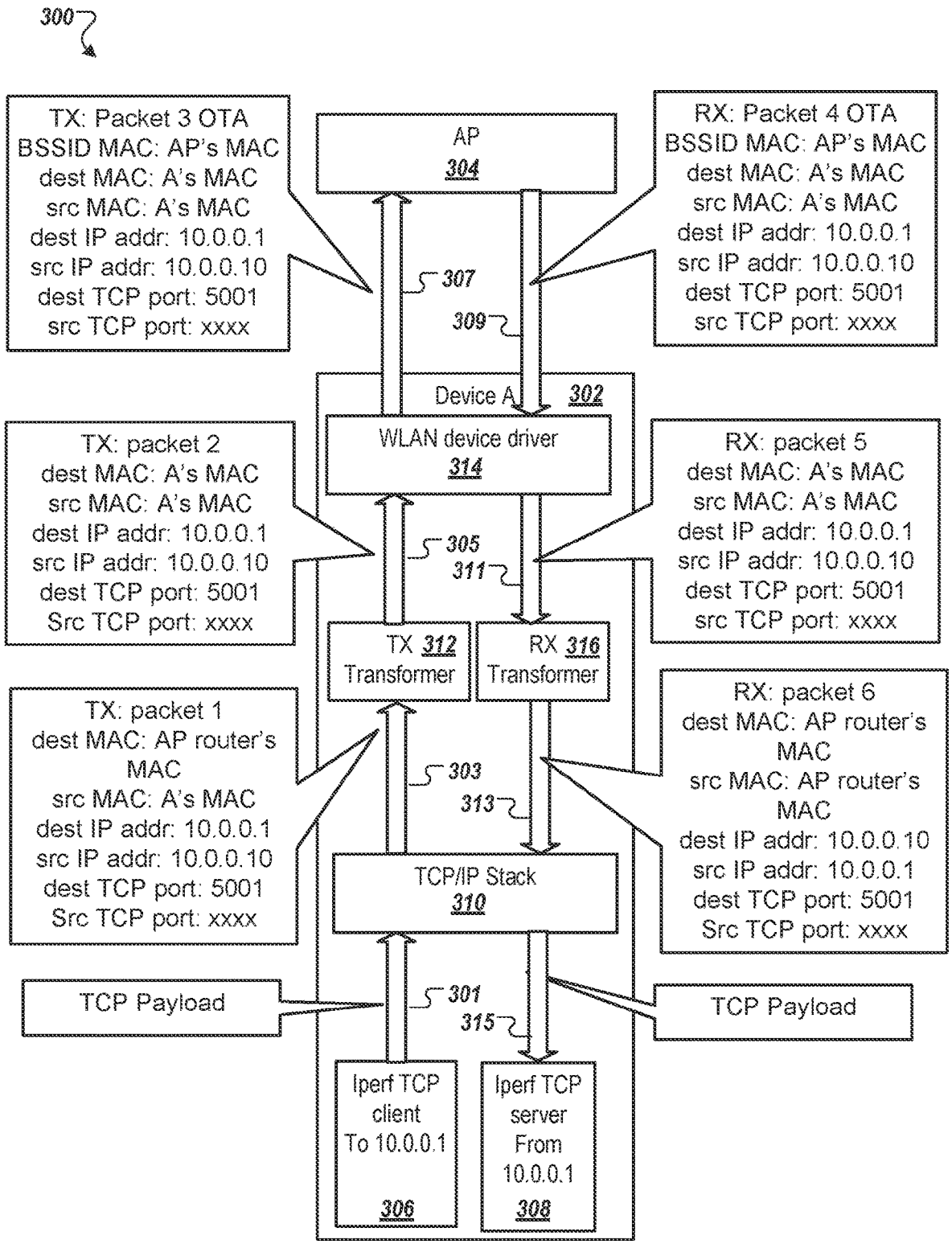
FIG. 3A is a block diagram of a first wireless device with transmit (TX) and receive (RX) transformers for a packet process flow in a first direction of a layer 2 (L2) approach according to one embodiment.

FIG. 3A is a block diagram of a first wireless device 302 with transmit (TX) and receive (RX) transformers for a packet process flow 300 in a first direction of a layer 2 approach according to one embodiment. First wireless device 302 is similar to first wireless device 108 of FIGS. 1-2 and AP 304 is similar to second wireless device 104 of FIGS. 1-2. First wireless device 302, hereinafter referred to as Device A 302, includes a pair of TX and RX packet transformers, including TX transformer 312 and RX transformer 316. TX transformer 312 and RX transformer 316 processes the TX/RX packets between a TCP/IP stack 310 and WLAN device driver 314. For example, after a TX packet is generated by TCP/IP stack 310 and before it is delivered to WLAN device driver 314, TX transformer 312 is called to process the TX packet. After an RX packet is received by WLAN device driver 314 and before it is delivered to TCP/IP stack 310, RX transformer 316 is called to process the RX packet. Details on how the TX/RX transformers process the packets are explained below with respect to an example.

In this example, Device A 302 starts an iperf TCP client 306 and an iperf TCP server 308. Device A 302 starts iperf TCP server 308 to listen on a port 5001 and launches iperf TCP client 306 to try to connect to an iperf TCP server on AP router (with an address of 10.0.0.1) (not illustrated in FIG. 3A). Iperf TCP client 306 generates a TCP payload 301 and triggers some outgoing data packets 303 (TX: packet 1) to be generated by TCP/IP stack 310. Outgoing packets 303 illustrate a first data packet, TX Packet 1, as having 10.0.0.1 as the destination IP address, local IP 10.0.0.10 as the source IP address, destination MAC address is AP router's address, and source MAC address is A's own MAC address. In one embodiment, the TCP/IP stack generates a first data packet using the TCP payload, the first data packet specifying an address of the second device in a destination address field and an address of the first wireless device in a source address field. TX transformer 312 handles the outgoing packets 303 (TX packet 1) from TCP/IP stack 310 and rewrites the destination MAC address to be Device A's own MAC address, generating transformed packets 305 (TX packet 2) and then delivering transformed packets 305 (TX: packet 2) to WLAN device driver 314.

In at least one embodiment, TX transformer 312 generates a second data packet from the first data packet by modifying data in the destination address field to be the same as the source address field. In at least one embodiment, a path includes a single link between Device A 302 and AP 304, and the destination address field in the first data packet specifies the MAC address of the AP 304, and the source address field specifies a MAC address of the Device A 302. In at least one embodiment, TX transformer 312 modifies the destination address field by changing the MAC address of AP 304 to the MAC address of Device A 302, as illustrated in FIG. 3A.

In at least one embodiment, WLAN device driver 314 converts the transformed packets (TX packet 2) into WLAN packets 307 with a layer 3-address format by adding a basic service set identifier (BSSID) address (AP's MAC address) to a header. WLAN device driver 314 transmits WLAN packets 307 (TX packet 3 Over the Air (OTA)) to AP 304 via a wireless connection (e.g., over the air) between Device A 302 and AP 304. In at least one embodiment, WLAN device driver 314 generates a third data packet from the second data packet by adding a WLAN header (i.e., adding a BSSID address, as well as other possible fields), and sends the third data packet to the second device. AP 304 can receive the WLAN packets 307 and AP 304 will echo the WLAN packets 307 as WLAN packets 309 (RX packet 4 OTA) back to Device A 302, since the destination MAC address is Device A's MAC. That is, because of the hairpin bridging of AP 304, AP 304 consequently sends WLAN packets 309 back to Device A 302 as a result of receiving WLAN packets 307 from Device A 302. WLAN device driver 314 removes the WLAN header (BSSID and other fields), generating incoming packets 311 (RX packet 5) and passes incoming packets 311 to RX transformer 316. In at least one embodiment, WLAN device driver 314 receives a fourth data packet, responsive to the third data packet being sent, and generates a fifth data packet by removing a WLAN header.

RX transformer 316 rewrites the incoming packets' source MAC address to be the AP router's MAC address and swaps the source and destination IP addresses, generating transformed packets 313 (RX packet 6) and then delivering transformed packets 313 (RX packet 6) to TCP/IP stack 310. In at least one embodiment, RX transformer 316 generates a sixth data packet from the fifth data packet by modifying a source address field to specify the address of the second device. The sixth data packet includes the TCP payload 315. As illustrated in FIG. 3A, the destination address field, and the source address field in the fifth data packet both specify the MAC address of Device A 302, and RX transformer 316 modifies the source address field by changing the MAC address of Device A 302 to the MAC address of the AP router device, changing a destination IP address field in the fifth data packet from an IP address of the AP router device to an IP address of Device A, and changing a source IP address field in the fifth data packet from the IP address of Device A to the IP address of the AP router device.

In at least one embodiment, TCP/IP stack 310 accepts transformed packets 313 (RX packet 6) because the destination MAC and IP addresses belong to Device A 302. TCP/IP stack 310 generates incoming packets 315 to be delivered to the local iperf TCP server's socket since iperf TCP server 308 is listening on the destination port of the packet (e.g., 5001). In at least one embodiment, a single-ended TCP measurement tool, including iperf TCP client 306, iperf TCP server 308, TX transformer 312, and RX transformer 316 can measure a value indicative of TCP throughput a link between Device A 302 and AP 304 using data associated with sending and receiving the packets with TCP payload.

In a further embodiment, the same packet process can also be applied to packets generated by iperf TCP server 308 and sent to an iperf TCP client on AP 304 as described below with respect to FIG. 3B.

Figure 3B:
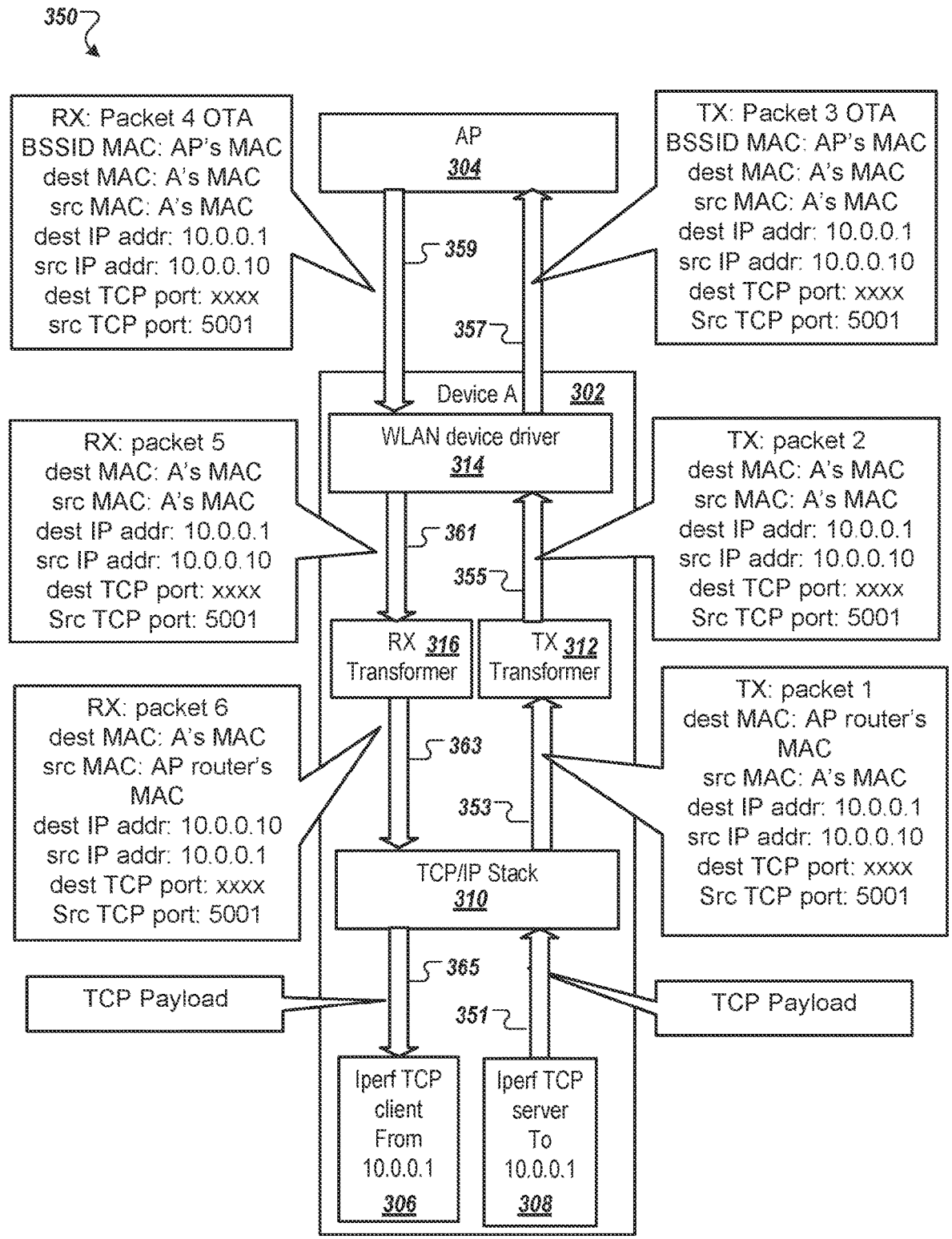
FIG. 3B is a block diagram of a first wireless device with TX and RX transformers for a packet process flow in a second direction of the layer 2 (L2) approach according to one embodiment.

FIG. 3B is a block diagram of a first wireless device 302 with TX and RX transformers for a packet process flow 350 in a second direction of the layer 2 approach according to one embodiment. In this example, Device A 302 starts iperf TCP client 306 to listen on a port 5001 and iperf TCP server 308 tries to connect to an iperf TCP client on AP router (with an address of 10.0.0.1). Iperf TCP client 306 generates a TCP payload 351 and triggers some outgoing packets 353 (TX: packet 1) to be generated by TCP/IP stack 310. Outgoing packets 353 illustrate a first data packet, TX Packet 1, as having 10.0.0.1 as the destination IP address, local IP 10.0.0.10 as the source IP address, destination MAC address is AP router's address, and source MAC address is A's own MAC address. In one embodiment, the TCP/IP stack generates a first data packet using the TCP payload, the first data packet specifying an address of the second device in a destination address field and an address of the first wireless device in a source address field. TX transformer 312 handles the outgoing packets 353 (TX packet 1) from TCP/IP stack 310 and rewrites the destination MAC address to be Device A's own MAC address, generating transformed packets 355 (TX packet 2) and then delivering transformed packets 355 (TX: packet 2) to WLAN device driver 314. In at least one embodiment, TX transformer 312 generates a second data packet from the first data packet by modifying data in the destination address field to be the same as the source address field. WLAN device driver 314 converts the transformed packets 355 (TX packet 2) into WLAN packets 357 with a layer 3-address format by adding BSSID address (AP's MAC address) to a header. WLAN device driver 314 transmits WLAN packets 357 (TX packet 3 Over the Air (OTA)) to AP 304 via a wireless connection (e.g., over the air) between Device A 302 and AP 304. In at least one embodiment, WLAN device driver 314 generates a third data packet from the second data packet by adding a WLAN header (i.e., adding a BSSID address, as well as other possible fields), and sends the third data packet to the second device. AP 304 can receive the WLAN packets 357 and AP 304 will echo the WLAN packets 357 as WLAN packets 359 (RX packet 4 OTA) back to Device A 302, since the destination MAC address is Device A's MAC. That is, because of the hairpin bridging of AP 304, AP 304 consequently sends WLAN packets 359 back to Device A 302 as a result of receiving WLAN packets 357 from Device A 302. WLAN device driver 314 removes the WLAN header (BSSID and other fields), generating incoming packets 361 (RX packet 5) and passes incoming packets 361 to RX transformer 316. In at least one embodiment, WLAN device driver 314 receives a fourth data packet, responsive to the third data packet being sent, and generates a fifth data packet by removing a WLAN header. RX transformer 316 rewrites the incoming packets' source MAC address to be the AP router's MAC address and swaps the source and destination IP addresses, generating transformed packets 363 (RX packet 6) and then delivering transformed packets 363 (RX packet 6) to TCP/IP stack 310. In at least one embodiment, RX transformer 316 generates a sixth data packet from the fifth data packet by modifying a source address field to specify the address of the second device. The sixth data packet includes the TCP payload. TCP/IP stack 310 will accept transformed packets 363 (RX packet 6) because the destination MAC and IP addresses belong to Device A 302. TCP/IP stack 310 generates incoming packets 365 to be delivered to the local iperf TCP server's socket since iperf TCP client 306 is listening on the destination port of the packet (e.g., 5001). In at least one embodiment, a single-ended TCP measurement tool, including iperf TCP client 306, iperf TCP server 308, TX transformer 312, and RX transformer 316 can measure a value indicative of TCP throughput a link between Device A 302 and AP 304 using data associated with sending and receiving the packets with TCP payload. A first value can be indicative of TCP throughput of a first link in a first direction and a second value can be indicative of TCP throughput of the first link in a second direction.

In one embodiment, with the above TX/RX packet transformations, the iperf TCP client 306 thinks it has connected to AP router 10.0.0.1 successfully, and the local iperf TCP server 308 believes it has accepted a connection from an iperf TCP client running on the AP router. The iperf test result provides the TCP round-trip throughput over the TCP round-trip throughput over a direct link between AP 304 and Device A 302. The single-ended TCP measurement tool sends data over the TCP connection as fast as it can. The single-ended TCP measurement tool also receives the echoed-back data concurrently. Then based on how many bytes have been sent and received during a predefined period, the single-ended TCP measurement tool can produce a summary about the TCP performance metrics, like peak speed, lowest speed, and average speed in mbps (megabits per second). Device A's TCP/IP stack believes it is talking to AP router with real AP router's MAC and IP address, but actually, AP router is never involved at all.

In at least one embodiment, TX transformer 312 handles and rewrites the egress packets using the following pseudo-code:

server_ip=load_config(SERVER_IP)//10.0.0.1 in case of FIG. 3
    server_port=load_config(SERVER_PORT)//5001 in case of FIG. 3
    server_mac=load_config(SERVER_MAC)//AP router's MAC address in case of FIG. 3
    if    (packet→eth.protocol==IPv4    &&
        packet→ip.dest_IP==server_ip
        && packet→ip.protocl==TCP
        && (packet→tcp.dport==server_port||packet→tcp.sport==server_port))
        packet→eth.dest_mac=server_mac
    }
    return Alternatively, other pseudo-code can be used to handle and rewrite egress packets.

In at least one embodiment, RX transformer 316 handles and rewrites the ingress packets using the following pseudo-code:

server_ip=load_config(SERVER_IP)//10.0.0.1 in case of FIG. 3
    server_port=load_config(SERVER_PORT)//5001 in case of FIG. 3
    server_mac=load_config(SERVER_MAC)//AP router's MAC address in case of FIG. 3
    if    (packet→eth.protocol==IPv4    &&
        packet→ip.dest_IP==server_ip
        && packet→ip.protocl==TCP
        && (packet→tcp.dport server_port||packet→tcp.sport server_port))
        packet→eth.src_mac=server_mac swap(&packet→ip.src_IP, &packet→ip.dest_IP)
    }
    return Alternatively, other pseudo-code can be used to handle and rewrite ingress packets.

It should be noted that since only IP source and destination IP addresses have been swapped during the TX/RX packet transformation, the IP layer and TCP checksums are not impacted and remain valid. Thus, there is no need to recalculate the two checksums. In at least one embodiment, AP 304 is a bridge device and echoes back the packets. In other embodiments, where the AP is not a bridge device, it will not echo back the packets, causing the L2 approach to fail.

In at least one embodiment, a layer 3 (L3) approach can be used in which hairpin routing is leveraged. Hairpin routing can also be referred to as network address translation (NAT) loopback. An AP router supports hairpin routing, which means if an IP packet is received from a LAN interface and its target destination IP address is another address within a local LAN, the AP router will still forward that packet to the target address back to the LAN. This feature can be leveraged to conduct an independent TCP throughput measurement by single-ended TCP measurement tool 106 on Device A. The idea is that Device A generates the IP packets with the source and destination IP address being its own address, the target MAC address being the AP router's address, and then sends the IP packets to the AP router. After AP router receives those packets and echoes such packets back to Device A since the target IP address is Device A. Example packet process flows are illustrated below with respect to FIGS. 4A-4B.

Figure 4A:
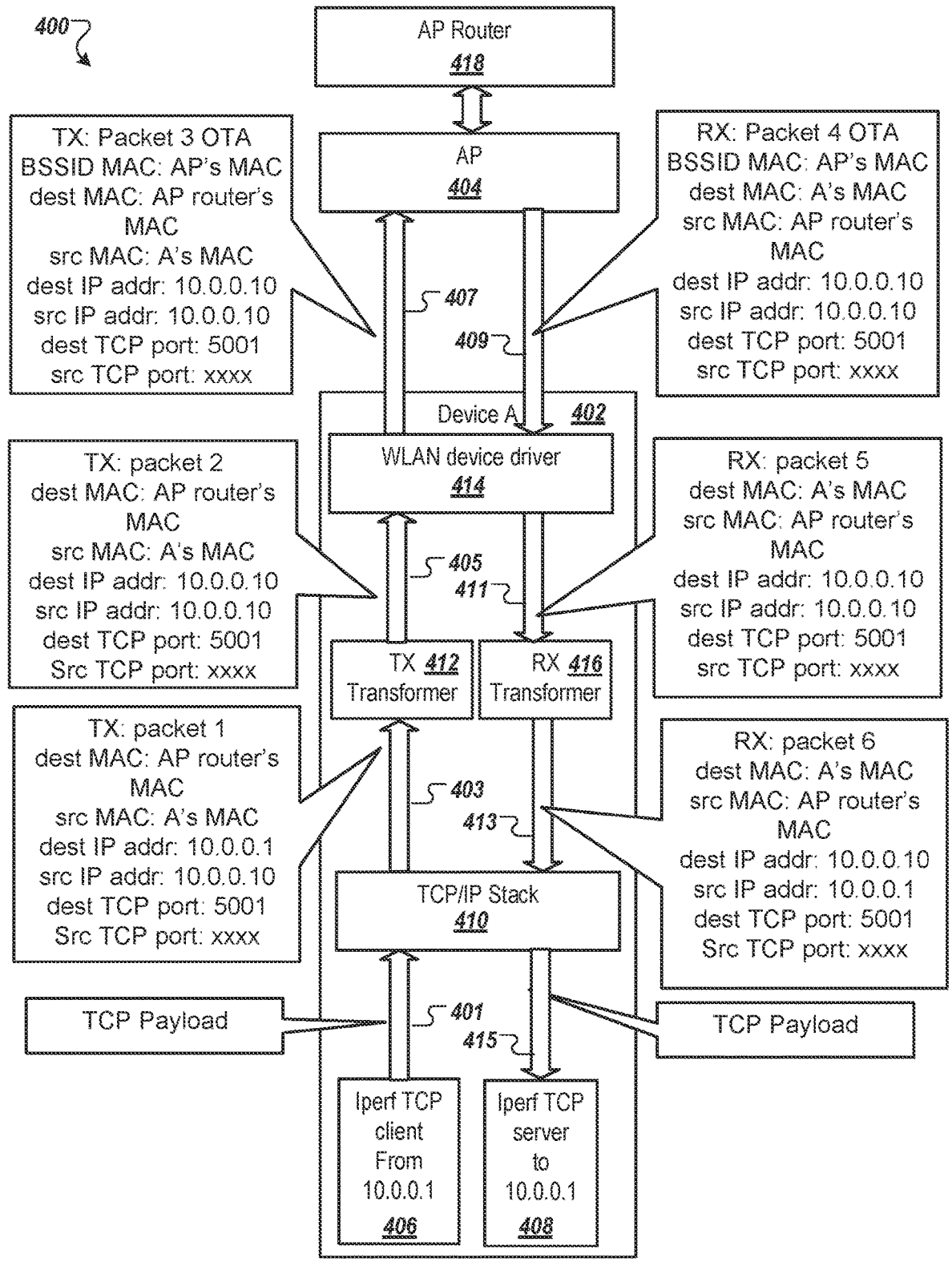
FIG. 4A is a block diagram of a first wireless device with TX and RX transformers for a packet process flow in a first direction of a layer 3 (L3) approach according to one embodiment.

FIG. 4A is a block diagram of a first wireless device with TX and RX transformers for a packet process flow in a first direction of a layer 3 (L3) approach according to one embodiment. First wireless device 402 is similar to first wireless device 108 of FIGS. 1-2, AP 404 is similar to second wireless device 104 of FIGS. 1-2, and AP router 418 is similar to third wireless device 102 of FIGS. 1-2. First wireless device 402, hereinafter referred to as Device A 402, includes a pair of TX and RX packet transformers, including TX transformer 412 and RX transformer 416. TX transformer 412 and RX transformer 416 processes the TX/RX packets between a TCP/IP stack 410 and WLAN device driver 414. For example, after a TX packet is generated by TCP/IP stack 410 and before it is delivered to WLAN device driver 414, TX transformer 412 is called to process the TX packet. After an RX packet is received by WLAN device driver 414 and before it is delivered to TCP/IP stack 410, RX transformer 416 is called to process the RX packet. Details on how the TX/RX transformers process the packets are explained below with respect to an example.

In this example, Device A 402 starts an iperf TCP client 406 and an iperf TCP server 408. Device A 402 starts iperf TCP server 408 to listen on a port 5001 and launches iperf TCP client 406 to try to connect to an iperf TCP server on AP router 418 (with an address of 10.0.0.1). Iperf TCP client 406 generates a TCP payload 401 and triggers some outgoing packets 403 (TX: packet 1) to be generated by TCP/IP stack 410. Outgoing packets 303 illustrate a first data packet, TX Packet 1, as having 10.0.0.1 as the destination IP address, local IP 10.0.0.10 as the source IP address, destination MAC address is AP router's address, and source MAC address is A's own MAC address. In one embodiment, TCP/IP stack 410 generates a first data packet using the TCP payload, the first data packet specifying an address of the second device in a destination address field and an address of the first wireless device in a source address field. TX transformer 412 handles the outgoing packets 403 (TX packet 1) from TCP/IP stack 410 and rewrites the destination IP address to be Device A's own IP address, generating transformed packets 405 (TX packet 2) and then delivering transformed packets 405 (TX: packet 2) to WLAN device driver 414. The checksums in the IP header and TCP header need to be recalculated correspondingly because of the change to the destination IP address. Now both the destination and source IP addresses are the same address 10.0.0.10.

In at least one embodiment, TX transformer 412 generates a second data packet from the first data packet by modifying data in the destination address field to be the same as the source address field. In at least one embodiment, an AP router 418 is communicatively coupled to AP 404 and a path includes a first link between Device A 402 and AP 404 and a second link between AP 404 and AP router 418. In at least one embodiment, the destination address field in the first data packet specifies an IP address of AP router 418 and the source address field specifies an IP address of Device A 402, and TX transformer 412 modifies the destination address field by changing the IP address of AP router 418 to the IP address of Device A 402, as illustrated in FIG. 4A;

In at least one embodiment, WLAN device driver 414 converts the transformed packets (TX packet 2) into WLAN packets 407 with a layer 3-address format by adding BSSID address (AP's MAC address) to a header. WLAN device driver 414 transmits WLAN packets 407 (TX packet 3 Over the Air (OTA)) to AP 404 via a first wireless connection (e.g., over the air) between Device A 402 and AP 404. AP 404 relays WLAN packets 407 to AP router 418 via a second wireless connection between AP 404 and AP router 418.

In at least one embodiment, WLAN device driver 414 generates a third data packet from the second data packet by adding a WLAN header (i.e., adding a BSSID address, as well as other possible fields), and sends the third data packet to the second device.

In at least one embodiment, AP router 418 can receive the WLAN packets 407 and AP router 418 will echo the WLAN packets 407 as WLAN packets 409 (RX packet 4 OTA) back to Device A 402 via AP 404, since the destination IP address is Device A's IP address 10.0.0.10. That is, because of the hairpin routing of AP router 418, AP router 418 consequently sends WLAN packets 409 back to AP 404, which sends WLAN packets 409 back to Device A 402 as a result of receiving WLAN packets 407 from Device A 402 via AP 404. WLAN device driver 414 removes the WLAN header (BSSID and other fields), generating incoming packets 411 (RX packet 5) and passes incoming packets 411 to RX transformer 416.

In at least one embodiment, WLAN device driver 414 receives a fourth data packet, responsive to the third data packet being sent, and generates a fifth data packet by removing a WLAN header. RX transformer 416 needs to recover the source IP address in the fifth data packet to be the AP router's IP address (10.0.0.1). RX transformer 416 rewrites the incoming packets' source IP address to be the AP router's IP address, generating transformed packets 413 (RX packet 6) and then delivering transformed packets 413 (RX packet 6) to TCP/IP stack 410. In at least one embodiment, RX transformer 416 generates a sixth data packet from the fifth data packet by modifying a source address field to specify the address of the second device. The sixth data packet includes the TCP payload 415. In at least one embodiment, as illustrated in FIG. 4A, the destination address field, and the source address field in the fifth data packet both specify the IP address of Device A 402, and RX transformer 416 modifies the source address field by changing the IP address of Device A 402 to the IP address of AP router 418.

In at least one embodiment, TCP/IP stack 410 accepts transformed packets 413 (RX packet 6) because the destination MAC and IP addresses belong to Device A 402. TCP/IP stack 410 generates incoming packets 415 to be delivered to the local iperf TCP server's socket since iperf TCP server 408 is listening on the destination port of the packet (e.g., 5001). In at least one embodiment, a single-ended TCP measurement tool, including iperf TCP client 406, iperf TCP server 408, TX transformer 412, and RX transformer 416 can measure a value indicative of TCP throughput a path, including a first link between Device A 402 and AP 404 and a second link between AP 404 and AP router 418 using data associated with sending and receiving the packets with TCP payload.

In a further embodiment, the same packet process can also be applied to packets generated by iperf TCP server 408 and sent to an iperf TCP client on AP 404 as described below with respect to FIG. 4B.

Figure 4B:
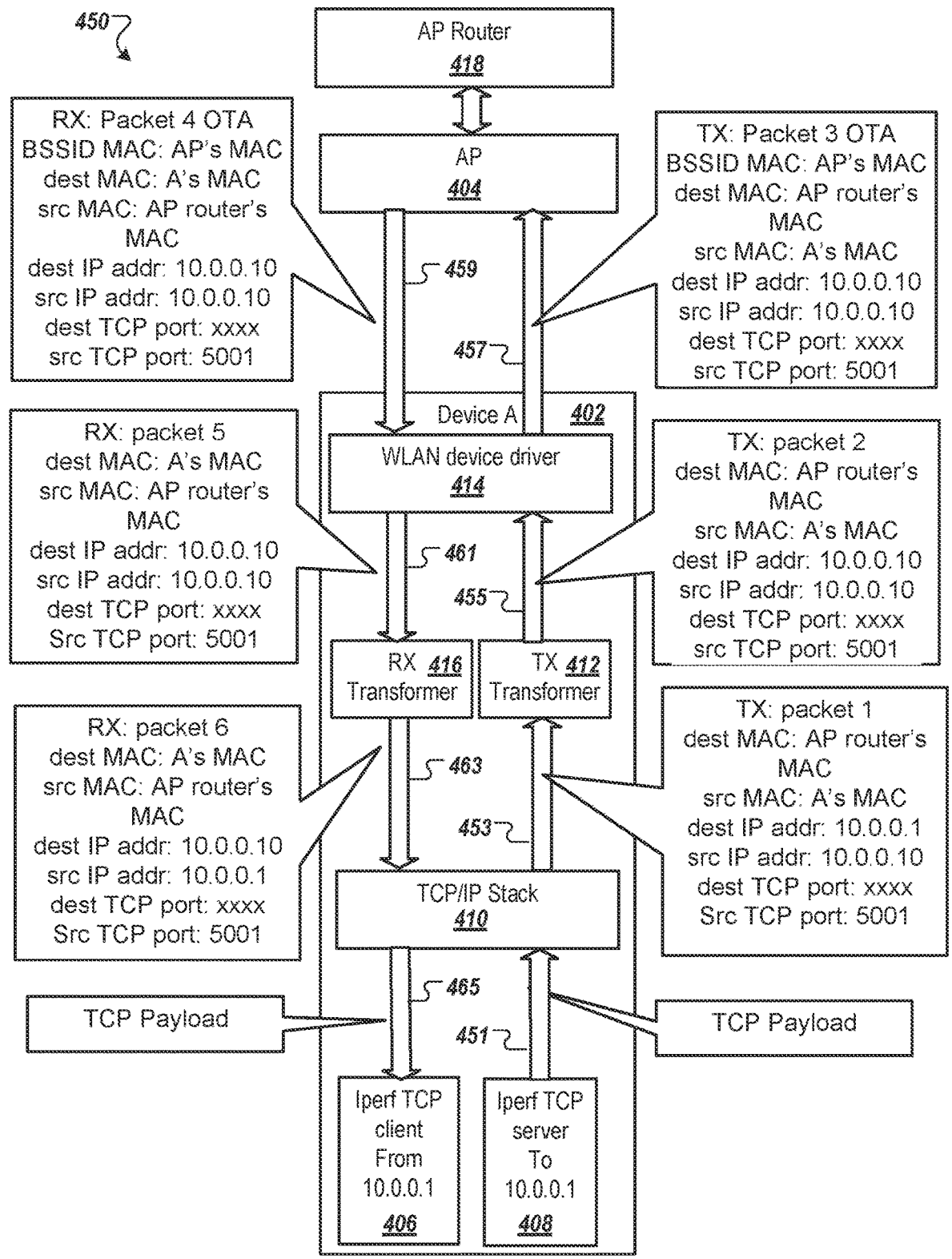
FIG. 4B is a block diagram of a first wireless device with TX and RX transformers for a packet process flow in a second direction of the layer 3 (L3) approach according to one embodiment.

FIG. 4B is a block diagram of a first wireless device 402 with TX and RX transformers for a packet process flow 450 in a second direction of the layer 3 approach according to one embodiment. In this example, Device A 402 starts iperf TCP client 406 to listen on a port 5001 and iperf TCP server 408 tries to connect to an iperf TCP client on AP router 418 (with an address of 10.0.0.1). Iperf TCP client 406 generates a TCP payload 451 and triggers some outgoing packets 453 (TX: packet 1) to be generated by TCP/IP stack 410. Outgoing packets 453 illustrate a first data packet, TX Packet 1, as having 10.0.0.1 as the destination IP address, local IP 10.0.0.10 as the source IP address, destination MAC address is AP router's address, and source MAC address is A's own MAC address. In one embodiment, the TCP/IP stack generates a first data packet using the TCP payload, the first data packet specifying an address of the second device in a destination address field and an address of the first wireless device in a source address field. TX transformer 412 handles the outgoing packets 453 (TX packet 1) from TCP/IP stack 410 and rewrites the destination MAC address to be Device A's own MAC address, generating transformed packets 455 (TX packet 2) and then delivering transformed packets 455 (TX: packet 2) to WLAN device driver 414. In at least one embodiment, TX transformer 412 generates a second data packet from the first data packet by modifying data in the destination address field to be the same as the source address field. In at least one embodiment, an AP router 418 is communicatively coupled to AP 404 and a path includes a first link between Device A 402 and AP 404 and a second link between AP 404 and AP router 418. In at least one embodiment, the destination address field in the first data packet specifies an IP address of AP router 418 and the source address field specifies an IP address of Device A 402, and TX transformer 412 modifies the destination address field by changing the IP address of AP router 418 to the IP address of Device A 402, as illustrated in FIG. 4B.

In at least one embodiment, WLAN device driver 414 converts the transformed packets 455 (TX packet 2) into WLAN packets 457 with a layer 3-address format by adding BSSID address (AP's MAC address) to a header. WLAN device driver 414 transmits WLAN packets 457 (TX packet 3 Over the Air (OTA)) to AP 404 via a first wireless connection (e.g., over the air) between Device A 402 and AP 404. AP 404 relays WLAN packets 457 to AP router 418 via a second wireless connection between AP 404 and AP router 418.

In at least one embodiment, WLAN device driver 414 generates a third data packet from the second data packet by adding a WLAN header (i.e., adding a BSSID address, as well as other possible fields), and sends the third data packet to the second device. AP 404 can receive the WLAN packets 457 and AP 404 will echo the WLAN packets 457 as WLAN packets 459 (RX packet 4 OTA) back to Device A 402, since the destination MAC address is Device A's MAC. That is, because of the hairpin routing of AP router 418, AP router 418 consequently sends WLAN packets 459 back to AP 404, which sends WLAN packets 459 back to Device A 402 as a result of receiving WLAN packets 457 from Device A 402. WLAN device driver 414 removes the WLAN header (BSSID and other fields), generating incoming packets 461 (RX packet 5) and passes incoming packets 461 to RX transformer 416. In at least one embodiment, WLAN device driver 414 receives a fourth data packet, responsive to the third data packet being sent, and generates a fifth data packet by removing a WLAN header. RX transformer 416 rewrites the incoming packets' source MAC address to be the AP router's MAC address and swaps the source and destination IP addresses, generating transformed packets 463 (RX packet 6) and then delivering transformed packets 463 (RX packet 6) to TCP/IP stack 410. In at least one embodiment, RX transformer 416 generates a sixth data packet from the fifth data packet by modifying a source address field to specify the address of the second device. The sixth data packet includes the TCP payload. In at least one embodiment, as illustrated in FIG. 4B, the destination address field and the source address field in the fifth data packet both specify the IP address of Device A 402, and RX transformer 416 modifies the source address field by changing the IP address of Device A 402 to the IP address of AP router 418.

In at least one embodiment, TCP/IP stack 410 accepts transformed packets 463 (RX packet 6) because the destination MAC and IP addresses belong to Device A 402. TCP/IP stack 410 generates incoming packets 465 to be delivered to the local iperf TCP server's socket since iperf TCP client 406 is listening on the destination port of the packet (e.g., 5001). In at least one embodiment, a single-ended TCP measurement tool, including iperf TCP client 406, iperf TCP server 408, TX transformer 412, and RX transformer 416 can measure a value indicative of TCP throughput a path, including a first link between Device A 402 and AP 404 and a second link between AP 404 and AP router 418 using data associated with sending and receiving the packets with TCP payload. A first value can be indicative of TCP throughput of the path in a first direction and a second value can be indicative of TCP throughput of the path in a second direction. The value indicative of TCP throughput of the path can include a first value indicative of TCP throughput of the first link and a second value indicative of TCP throughput of the second link.

In one embodiment, with the above TX/RX packet transformations, the iperf TCP client 406 thinks it has connected to AP router 418 (10.0.0.1) successfully, and the local iperf TCP server 408 believes it has accepted a connection from an iperf TCP client running on AP router 418. The iperf test result provides the TCP round-trip throughput over a two-hop path between AP router 418 and Device A 402. Device A's TCP/IP stack believes it is talking to AP router with real AP router's MAC and IP address, but actually, AP router merely echoes back packets received from AP 404. The single-ended TCP measurement tool sends data over the TCP connection as fast as it can. The single-ended TCP measurement tool also receives the echoed-back data concurrently. Then based on how many bytes have been sent and received during a predefined period, the single-ended TCP measurement tool can produce a summary about the TCP performance metrics, like peak speed, lowest speed, and average speed in mbps (megabits per second).

In at least one embodiment, TX transformer 412 handles and rewrites the egress packets using the following pseudo-code:

server_ip=load_config(SERVER_IP)//10.0.0.1 in case of FIG. 4 local_ip=load_config(LOCAL_IP)//10.0.0.10 in case of FIG. 4 server_port=load_config(SERVER_PORT)//5001 in case of FIG. 4 if (packet→eth.protocol==IPv4 && packet→ip.dest_ip==server_ip

&& packet→ip.protocl==TCP

&& (packet→tcp.dport==server_port||packet→tcp.sport==server_port))

packet→ip.dest_ip=local_ip update_ip_checsum(&packet→ip)//recalculate IP header's checksum update_tcp_checksum(&packet→ip)//recalculate TCP header's checksum

} return

Alternatively, other pseudo-code can be used to handle and rewrite egress packets.

In at least one embodiment, RX transformer 416 handles and rewrites the ingress packets using the following pseudo-code:

server_ip=load_config(SERVER_IP)//10.0.0.1 in case of FIG. 4
    local_ip=load_config(LOCAL_IP)//10.0.0.10 in case of FIG. 4
    server_port=load_config(SERVER_PORT)//5001 in case of FIG. 4
    if      (packet→eth.protocol==IPv4        &&
        packet→ip.dest_ip==local_ip
        &&      packet→ip.src_ip==local_ip         and
            packet→ip.protocl==TCP
        && (packet→tcp.dport server_port||packet→tcp.sport server_port))
            packet→ip.src_ip=server_ip
            update_ip_checsum(&packet→ip)//recalculate   IP header's checksum
            update_tcp_checksum(&packet→ip)//recalculate TCP header's checksum
    }
    return Alternatively, other pseudo-code can be used to handle and rewrite ingress packets.

It should be noted that IP addresses have been changed during the TX/RX packet transformation, the IP layer and TCP checksums need to be recalculated for proper operations. It should also be noted that this layer 3 approach requires a target node (e.g., AP router 418) to be an IP router device. If the target node is not running as a router, the target node will not route back the IP packets, causing the L3 approach to fail.

As described above layer 2 and layer 3 approaches use target nodes that are either bridge devices or router devices, so these approaches cannot be used to measure TCP throughput with other devices, such as client devices that are part of a local area network (LAN or WLAN).

In at least one embodiment, a layer 4 (L4) approach using TCP over ICMP can be used in which ICMP echo requests and replies (also referred to as Ping) are sent to and from all local network devices. This feature can be leveraged to conduct an independent TCP throughput measurement by single-ended TCP measurement tool 106 on Device A. The idea is that when the TX transformer detects an outgoing TCP packet for measurement, the TX transformer translates the TCP packet into an ICMP ECHO request packet. The content of this ICMP ECHO packet contains the original TCP header and TCP payload. The destination and source IP addresses are not changed. Then the target node will echo back an ICMP ECHO reply packet. The RX transformer just converts the ICMP ECHO response back to the TCP packet with the original TCP header and payload and then passes it to the TCP/IP stack. Those packet transformations will result in the same seamless loopback TCP connection between the local iperf TCP client and the local iperf TCP server. Example packet process flows are illustrated below with respect to FIGS. 5A-5B.

Figure 5A:
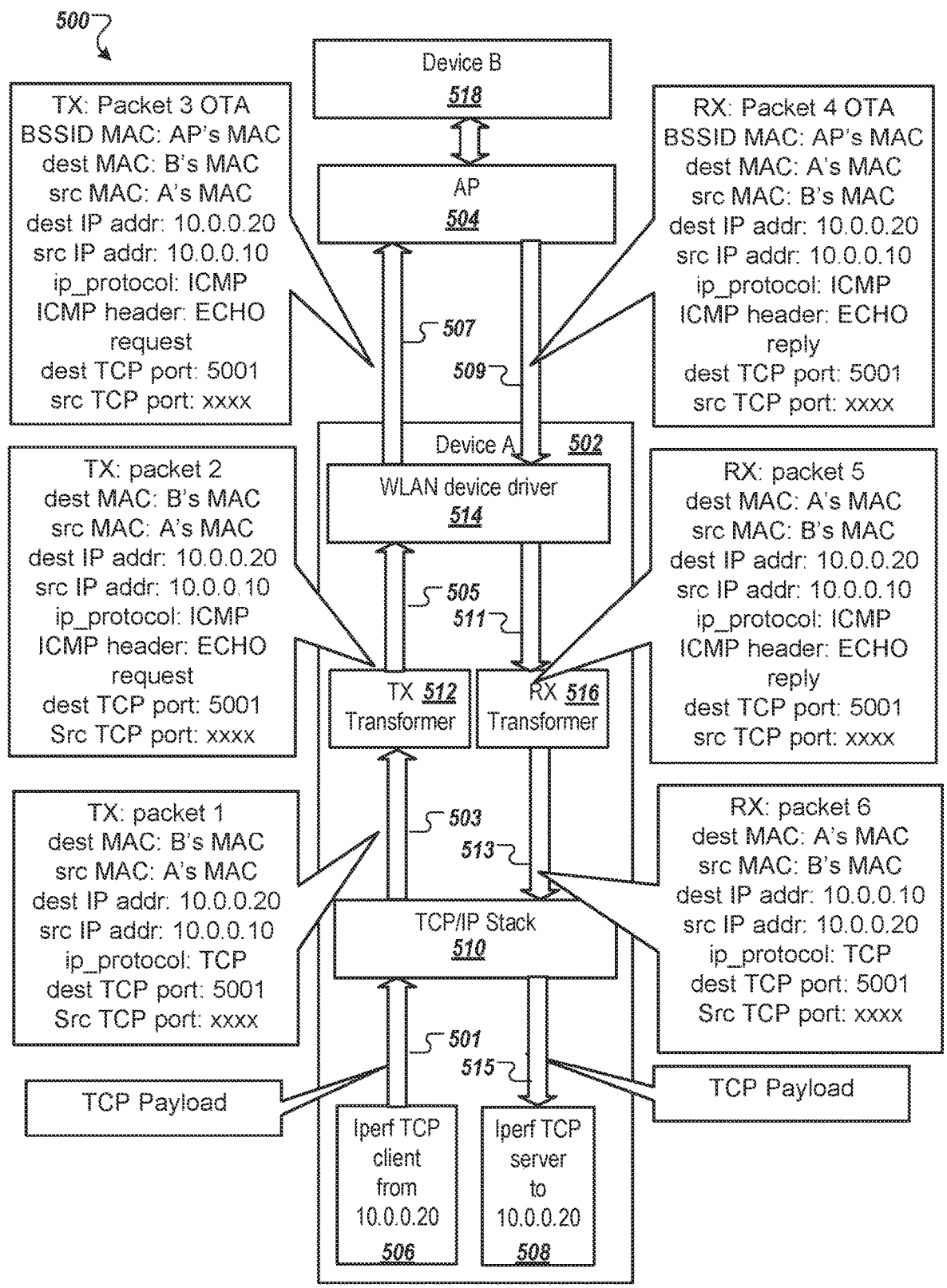
FIG. 5A is a block diagram of a first wireless device with TX and RX transformers for a packet process flow in a first direction of a layer 4 (L4) approach according to one embodiment.

FIG. 5A is a block diagram of a first wireless device with TX and RX transformers for a packet process flow in a first direction of a layer 4 (L4) approach (also referred to as TCP over ICMP approach) according to one embodiment. First wireless device 502 is similar to first wireless device 108 of FIGS. 1-2, AP 504 is similar to second wireless device 104 of FIGS. 1-2, and Device B 518 is similar to endpoint device 122 (or 132) of FIGS. 1-2. First wireless device 502, hereinafter referred to as Device A 502, includes a pair of TX and RX packet transformers, including TX transformer 512 and RX transformer 516. TX transformer 512 and RX transformer 516 processes the TX/RX packets between a TCP/IP stack 510 and WLAN device driver 514. For example, after a TX packet is generated by TCP/IP stack 510 and before it is delivered to WLAN device driver 514, TX transformer 512 is called to process the TX packet. After an RX packet is received by WLAN device driver 514 and before it is delivered to TCP/IP stack 510, RX transformer 516 is called to process the RX packet. Details on how the TX/RX transformers process the packets are explained below with respect to an example.

In this example, Device A 502 starts an iperf TCP client 506 and an iperf TCP server 508. Device A 502 starts iperf TCP server 508 to listen on a port 5001 and launches iperf TCP client 506 to try to connect to an iperf TCP server on Device B 518 (with an address of 10.0.0.20). Iperf TCP client 506 generates a TCP payload 501 and triggers some outgoing packets 503 (TX: packet 1) to be generated by TCP/IP stack 510. Outgoing packets 303 illustrate a first data packet, TX Packet 1, as having 10.0.0.20 as the destination IP address, local IP 10.0.0.10 as the source IP address, destination MAC address is Device B's address, and source MAC address is A's own MAC address. In one embodiment, TCP/IP stack 510 generates a first data packet using the TCP payload, the first data packet specifying an address of the second device in a destination address field and an address of the first wireless device in a source address field. TX transformer 512 handles the outgoing packets 503 (TX packet 1) from TCP/IP stack 510 and inserts an ICMP ECHO request header between IP header and TCP header and changes the IP protocol type from TCP to ICMP, generating transformed packets 505 (TX packet 2) and then delivering transformed packets 505 (TX: packet 2) to WLAN device driver 514. The checksums in the IP header needs to be recalculated correspondingly because of the protocol type change.

In at least one embodiment, Device B 518 is communicatively coupled to AP 504 and a path includes a first link between Device A 502 and AP 504 and a second link between AP 504 and Device B 518. In at least one embodiment, the destination address field in the first data packet specifies an IP address of Device B 518 and the source address field specifies an IP address of Device A 502, and TX transformer 512 inserts the ICMP header, changes the protocol type to ICMP and calculates a checksum for the IP header, as illustrated in FIG. 5A.

In at least one embodiment, WLAN device driver 514 converts the transformed packets (TX packet 2) into WLAN packets 507 with a layer 3-address format by adding BSSID address (AP's MAC address) to a header. WLAN device driver 514 transmits WLAN packets 507 (TX packet 3 Over the Air (OTA)) to AP 504 via a first wireless connection (e.g., over the air) between Device A 502 and AP 504. AP 504 relays WLAN packets 507 to Device B 518 via a second wireless connection between AP 504 and Device B 518.

In at least one embodiment, WLAN device driver 514 generates a third data packet from the second data packet by adding a WLAN header (i.e., adding a BSSID address, as well as other possible fields), and sends the third data packet to the second device.

In at least one embodiment, Device B 518 can receive the WLAN packets 507 and Device B 518 will echo the WLAN packets 507 as WLAN packets 509 (RX packet 4 OTA) back to Device A 502 via AP 504, since the destination IP address is Device A's IP address 10.0.0.10. That is, because of the ICMP header, Device B 518 consequently sends WLAN packets 509 back to AP 504, which sends WLAN packets

509 back to Device A 502 as a result of receiving WLAN packets 507 from Device A 502 via AP 504. In at least one embodiment, Device B 518 sends ICMP ECHO reply packets back to Device A 504 through AP 504. The ICMP payload contains the original TCP header/payload sent by Device A 502. WLAN device driver 514 removes the WLAN header (BSSID and other fields), generating incoming packets 511 (RX packet 5) and passes incoming packets 511 to RX transformer 516.

In at least one embodiment, WLAN device driver 514 receives a fourth data packet, responsive to the third data packet being sent, and generates a fifth data packet by removing a WLAN header. RX transformer 516 needs to remove the ICMP header in the fifth data packet, change the protocol type from ICMP to TCP, and recalculate the checksum of the IP header, generating transformed packets 513 (RX packet 6) and then delivering transformed packets 513 (RX packet 6) to TCP/IP stack 510. In at least one embodiment, RX transformer 516 generates a sixth data packet from the fifth data packet by modifying i) inserting ICMP header between an IP header and a TCP header of the fifth data packet, the ICMP header comprising an echo request, ii) changing an IP protocol type to ICMP from TCP, and iii) calculating a checksum for the IP header after inserting the ICMP header and changing the IP protocol type to ICMP from TCP, as illustrated in FIG. 5A. The sixth data packet includes the TCP payload 515.

In at least one embodiment, TCP/IP stack 510 accepts transformed packets 513 (RX packet 6) because the destination MAC and IP addresses belong to Device A 502. TCP/IP stack 510 generates incoming packets 515 to be delivered to the local iperf TCP server's socket since iperf TCP server 508 is listening on the destination port of the packet (e.g., 5001). In at least one embodiment, a single-ended TCP measurement tool, including iperf TCP client 506, iperf TCP server 508, TX transformer 512, and RX transformer 516 can measure a value indicative of TCP throughput a path, including a first link between Device A 502 and AP 504 and a second link between AP 504 and Device B 518 using data associated with sending and receiving the packets with TCP payload.

In a further embodiment, the same packet process can also be applied to packets generated by iperf TCP server 508 and sent to an iperf TCP client on AP 504 as described below with respect to FIG. 5B.

Figure 5B:
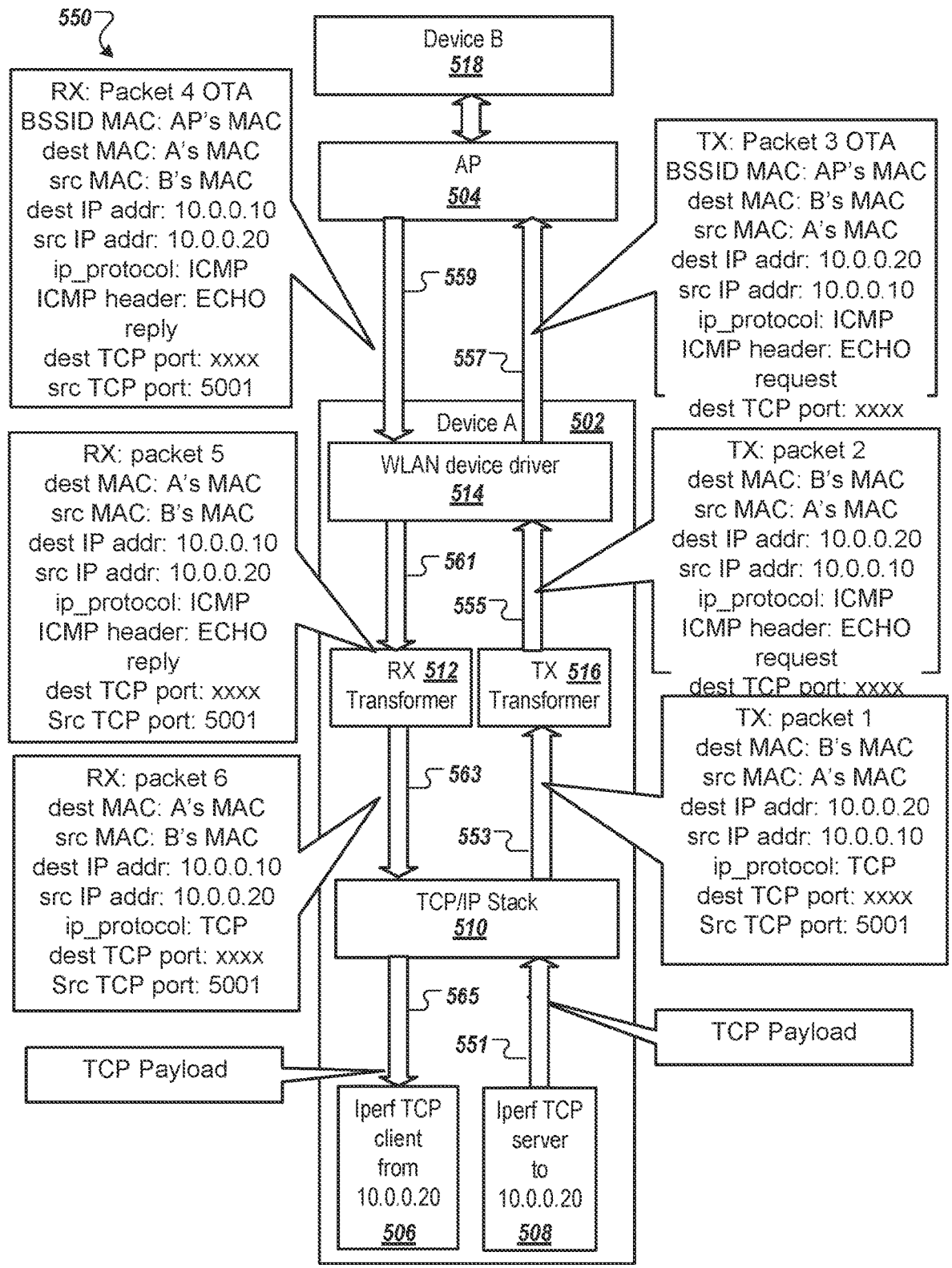
FIG. 5B is a block diagram of a first wireless device with TX and RX transformers for a packet process flow in a second direction of the layer 4 (L4) approach according to one embodiment.

FIG. 5B is a block diagram of a first wireless device 502 with TX and RX transformers for a packet process flow 550 in a second direction of the layer 4 approach according to one embodiment. In this example, Device A 502 starts iperf TCP client 506 to listen on a port 5001 and iperf TCP server 508 tries to connect to an iperf TCP client on Device B 518 (with an address of 10.0.0.20). Iperf TCP client 506 generates a TCP payload 551 and triggers some outgoing packets 553 (TX: packet 1) to be generated by TCP/IP stack 510. Outgoing packets 553 illustrate a first data packet, TX Packet 1, as having 10.0.0.20 as the destination IP address, local IP 10.0.0.10 as the source IP address, destination MAC address is Device B's address, and source MAC address is A's own MAC address. In one embodiment, the TCP/IP stack generates a first data packet using the TCP payload, the first data packet specifying an address of the second device in a destination address field and an address of the first wireless device in a source address field. TX transformer 512 handles the outgoing packets 553 (TX packet 1) from TCP/IP stack 510 and rewrites the destination MAC address to be Device A's own MAC address, generating transformed packets 555 (TX packet 2) and then delivering transformed packets 555 (TX: packet 2) to WLAN device driver 514. In at least one embodiment, TX transformer 512 generates a second data packet from the first data packet by modifying data in the destination address field to be the same as the source address field. In at least one embodiment, Device B 518 is communicatively coupled to AP 504 and a path includes a first link between Device A 502 and AP 504 and a second link between AP 504 and Device B 518. In at least one embodiment, the destination address field in the first data packet specifies an IP address of Device B 518 and the source address field specifies an IP address of Device A 502, and TX transformer 512 inserts the ICMP header, changes the protocol type to ICMP and calculates a checksum for the IP header, as illustrated in FIG. 5B.

In at least one embodiment, WLAN device driver 514 converts the transformed packets 555 (TX packet 2) into WLAN packets 557 with a layer 3-address format by adding BSSID address (AP's MAC address) to a header. WLAN device driver 514 transmits WLAN packets 557 (TX packet 3 Over the Air (OTA)) to AP 504 via a first wireless connection (e.g., over the air) between Device A 502 and AP 504. AP 504 relays WLAN packets 557 to Device B 518 via a second wireless connection between AP 504 and Device B 518.

In at least one embodiment, WLAN device driver 514 generates a third data packet from the second data packet by adding a WLAN header (i.e., adding a BSSID address, as well as other possible fields), and sends the third data packet to the second device.

In at least one embodiment, Device B 518 can receive the WLAN packets 557 and Device B 518 will echo the WLAN packets 557 as WLAN packets 559 (RX packet 4 OTA) back to Device A 502 via AP 504, since the destination IP address is Device A's IP address 10.0.0.10. That is, because of the ICMP header, Device B 518 consequently sends WLAN packets 559 back to AP 504, which sends WLAN packets 559 back to Device A 502 as a result of receiving WLAN packets 507 from Device A 502 via AP 504. In at least one embodiment, Device B 518 sends ICMP ECHO reply packets back to Device A 504 through AP 504. The ICMP payload contains the original TCP header/payload sent by Device A 502. WLAN device driver 514 removes the WLAN header (BSSID and other fields), generating incoming packets 561 (RX packet 5) and passes incoming packets 561 to RX transformer 516.

In at least one embodiment, WLAN device driver 514 receives a fourth data packet, responsive to the third data packet being sent, and generates a fifth data packet by removing a WLAN header. RX transformer 516 needs to remove the ICMP header in the fifth data packet, change the protocol type from ICMP to TCP, and recalculate the checksum of the IP header, generating transformed packets 563 (RX packet 6) and then delivering transformed packets 563 (RX packet 6) to TCP/IP stack 510. In at least one embodiment, RX transformer 516 generates a sixth data packet from the fifth data packet by modifying i) inserting ICMP header between an IP header and a TCP header of the fifth data packet, the ICMP header comprising an echo request, ii) changing an IP protocol type to ICMP from TCP, and iii) calculating a checksum for the IP header after inserting the ICMP header and changing the IP protocol type to ICMP from TCP, as illustrated in FIG. 5B. The sixth data packet includes the TCP payload 565.

In at least one embodiment, TCP/IP stack 510 accepts transformed packets 563 (RX packet 6) because the destination MAC and IP addresses belong to Device A 502. TCP/IP stack 510 generates incoming packets 565 to be delivered to the local iperf TCP server's socket since iperf TCP client 506 is listening on the destination port of the packet (e.g., 5001). In at least one embodiment, a single-ended TCP measurement tool, including iperf TCP client 506, iperf TCP server 508, TX transformer 512, and RX transformer 516 can measure a value indicative of TCP throughput a path, including a first link between Device A 502 and AP 504 and a second link between AP 504 and Device B 518 using data associated with sending and receiving the packets with TCP payload. A first value can be indicative of TCP throughput of the path in a first direction and a second value can be indicative of TCP throughput of the path in a second direction. The value indicative of TCP throughput of the path can include a first value indicative of TCP throughput of the first link and a second value indicative of TCP throughput of the second link.

In one embodiment, with the above TX/RX packet transformations, the iperf TCP client 506 thinks it has connected to Device B 518 (10.0.0.20) successfully, and the local iperf TCP server 508 believes it has accepted a connection from an iperf TCP client running on Device B 518. The iperf test result provides the TCP round-trip throughput over a two-hop path between Device B 518 and Device A 502. Device A's TCP/IP stack believes it is talking to Device B with real Device B's MAC and IP address, but actually, Device B merely echoes back packets received from AP 504. The single-ended TCP measurement tool sends data over the TCP connection as fast as it can. The single-ended TCP measurement tool also receives the echoed-back data concurrently. Then based on how many bytes have been sent and received during a predefined period, the single-ended TCP measurement tool can produce a summary about the TCP performance metrics, like peak speed, lowest speed, and average speed in mbps (megabits per second).

In at least one embodiment, TX transformer 512 handles and rewrites the egress packets using the following pseudo-code:

```
server_ip=load_config(SERVER_IP)//10.0.0.20 in case of FIG. 5
local_ip=load_config(LOCAL_IP)//10.0.0.10 in case of FIG. 5
server_port=load_config(SERVER_PORT)//5001 in case of FIG. 5
icmp_seq=load_config(ICMP_SEQ)
icmp_id=load_config(ICMP_ID)
if     (packet→eth.protocol==IPv4     and
    packet→ip.dest_ip==server_ip
    and packet→ip.protocl==TCP
    and    (packet→tcp.dport==server_port    or
    packet→tcp.sport==server_port)) {
  //expand packet header room by 8 bytes to accommodate ICMP header
  expand_packet_header_room(packet, size of(ICMP header))
  //move ethernet and IP headers by 8 bytes to give room to ICMP header
  move_eth_ip_header(&packet→eth, &packet→head, size of(Ether header+IP header))
  //insert the ICMP header
  packet→ip.protocol=ICMP
  packet→icmp.type=ECHO
  packet→icmp.code=0
  packet→icmp.id=icmp_id
  packet→icmp.seq=icmp_seq++
  update_ip_checsum(&packet→ip)//recalculate IP header's checksum
  update_icmp checksum(&packet→ip)//calculate ICMP header's checksum
  save config(ICMP_SEQ, icmp_seq)
}
return
```

Alternatively, other pseudo-code can be used to handle and rewrite egress packets.

In at least one embodiment, RX transformer 516 handles and rewrites the ingress packets using the following pseudo-code:

```
server_ip=load_config(SERVER_IP)//10.0.0.20 in case of FIG. 5
local_ip=load_config(LOCAL_IP)//10.0.0.10 in case of FIG. 5
server_port=load_config(SERVER_PORT)//5001 in case of FIG. 5
if     (packet→eth.protocol==IPv4     and
    packet→ip.dest_ip==local_ip
    and    packet→ip.src_ip==local_ip    and
    packet→ip.protocl==ICMP) {
  tcp=packet→icmp+size of(ICMP header)
  if     (tcp→dport==server_port    or
    tcp→sport==server_port))
    //increase IP header len by 2 words (8 byte)
    packet.ip→header_len+=size of (ICMP header)>>2
    //convert ICMP header to be IP option NOOP: 0x01
    char *p=(char *)packet.icmp
    for (int i=0; i<size of(ICMP header); i++)
      p[i]=IP_OPT_NOOP
  }
  packet.ip→protocol=TCP
  update_ip_checsum(&packet→ip)//recalculate IP header's checksum
}
return
```

Alternatively, other pseudo-code can be used to handle and rewrite ingress packets.

It should be noted that the IP protocol type has been changed during the TX/RX packet transformation, the checksum of the IP header needs to be recalculated for proper operations. In at least one embodiment of the layer 4 approach, RX transformer, instead of moving memory of TCP payload to remove ICMP header, the ICMP header is just replaced with 8-byte of IP header option IP_OPT_NOOP (No Operation) to become part of IP header. This can be done to remove extra headers after the IP header without moving/copying memory in the packet.

With the above TX/RX packet transformation, the iperf TCP client thinks it has connected to device B 10.0.0.20 successfully, and the local iperf TCP server believes it has accepted a connection from the iperf TCP client running on device B. The iperf test result actually provides the TCP round-trip throughput over the 2-hop path between Device A and B. This method can be applied to allow Device A to measure the TCP throughput between itself and any other local devices including AP, AP router, device B, and device C, as long as those devices support ICMP ECHO without ICMP packet rate and size restriction.

As described above single-ended TCP measurement tool 106 uses TX and RX transformers. These TX/RX transformers can be hooks inside a kernel TCP/IP stack or in a network device driver. Alternatively, TX/RX transformers can be implemented in portable existing mechanisms, such as an extended Berkley Packet Filter (eBPF) program of the Traffic Control subsystem (TC). On a Linux platform, eBPF can be leveraged and TC "classifiers" (also known as filters)

or "actions" (CLS_ACT) can allow user-mode applications to inject eBFP binary code into the kernel to handle and process the ingress and egress packets between TCP/IP stack and a network device driver. In at least one embodiment, actions can be used for the TX transformer and RX transformer for the kernel TCP/IP stack, such as illustrated in FIG. 6.

Figure 6:
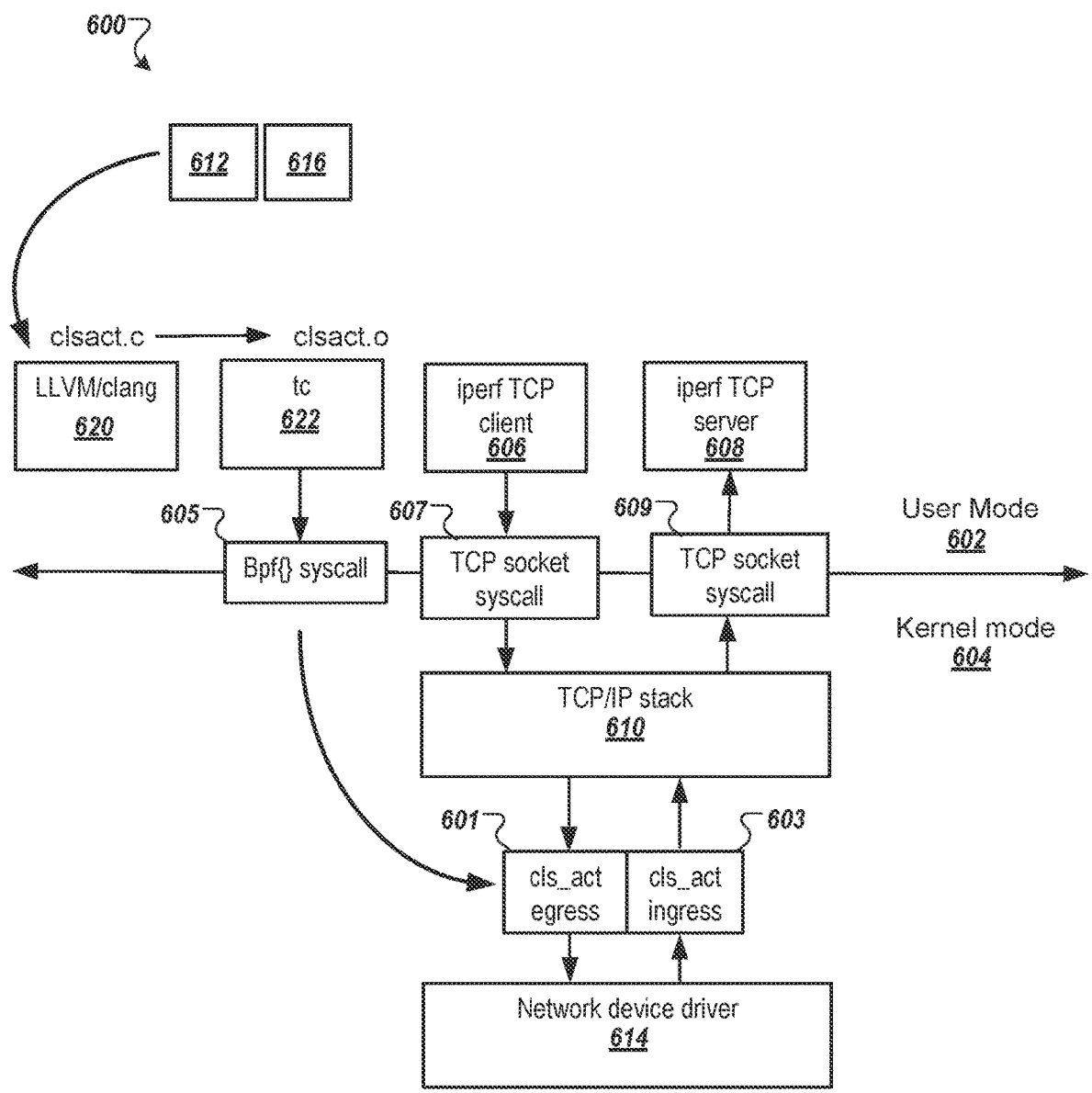
FIG. 6 is a block diagram of a kernel-mode extended Berkley Packet Filter (BPF) based TX/RX transformer according to one embodiment.

FIG. 6 is a block diagram of a kernel-mode extended Berkley Packet Filter (BPF) based TX/RX transformer according to one embodiment. An architecture 600 of TC CLS_ACT with eBPF and TX transformer 612 and RX transformer 615 are implemented in the eBPF program in code (e.g., C code). After being compiled by a compiler 620 (e.g., LLVM/clang compiler), the eBPF binary object code, tc 622 in user mode 602, which also include iperf TCP client 606 and iperf TCP server 608. Tc 622 can be injected into kernel mode 604 as hooks as cls_act ingress packet filter 601 and cls_act egress packet filter 603. The cls_act ingress packet filter 601 and cls_act egress packet filter 603 can be called using Linux "tc" command 605 (e.g., Bpf{ } syscall). Packets from iperf TCP client 606 and iperf TCP server 608 will be processed by cls_act ingress filter 601 and cls_act egress packet filter 603, respectively, to conduct transformations according to the layer 2, layer 3, and/or layer 4 approaches described above.

The mechanisms of TC CLS_ACT eBPF are available after Linux kernel 4.4. On older versions of Linux, Unix/Windows, and other platforms, TUN/TAP interface can be used to implement the user-mode TX/RX packet transformers. TUN/TAP is a special network device driver that creates a virtual network interface. Application and TCP/IP stack can send outgoing IP packets to the virtual network interface. Those egress raw IP packets will be rerouted back to a user-mode daemon to process. The daemon process can also write some packets to the TUN/TAP driver. Those packets are passed to the TCP/IP stack as normal ingress packets. The overall architecture of the TUN approach is demonstrated in FIG. 7.

Figure 7:
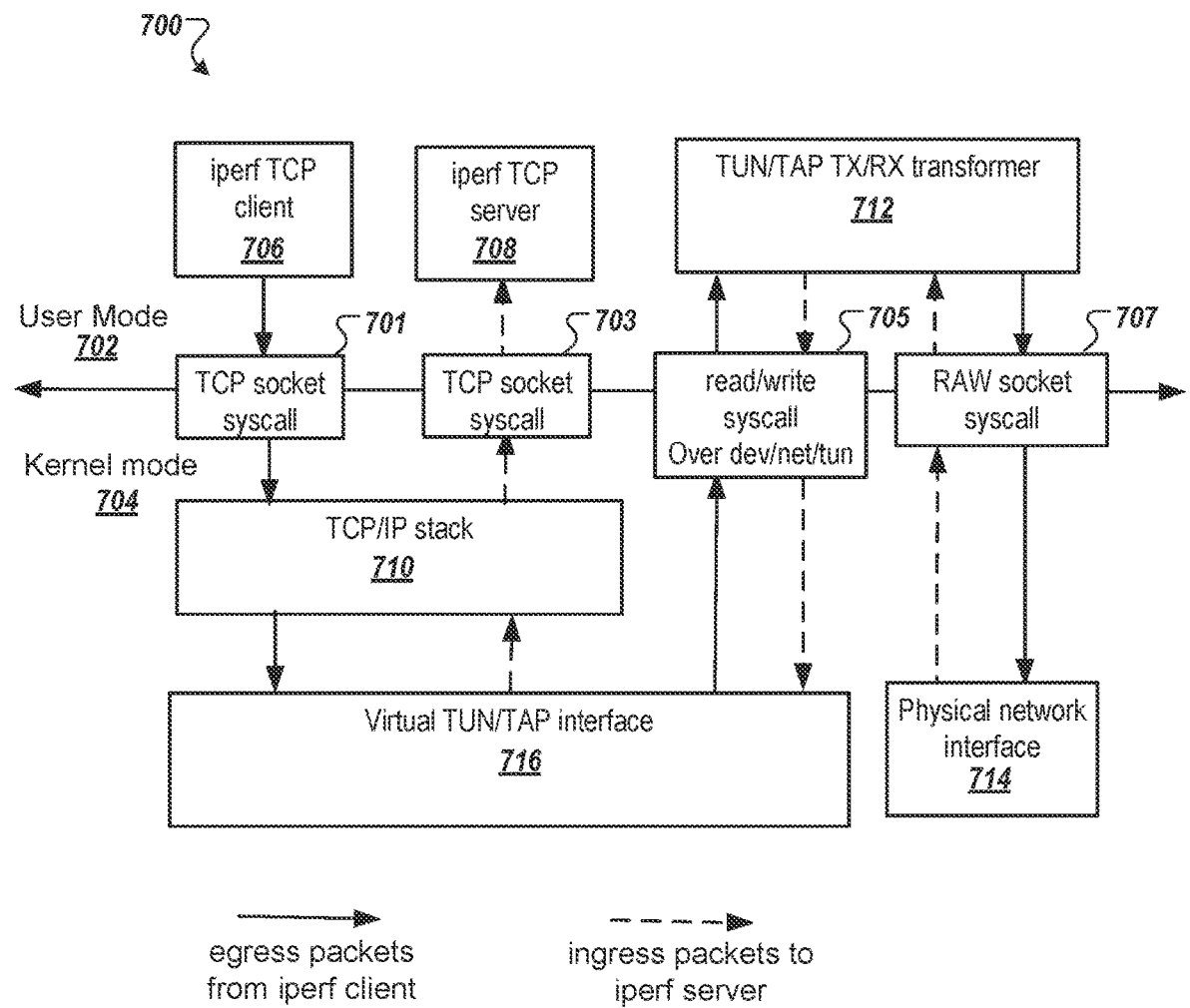
FIG. 7 is a block diagram of a virtual network interface based TX/RX transformer according to one embodiment.

FIG. 7 is a block diagram of a virtual network interface based TX/RX transformer according to one embodiment. A TUN/TAP daemon 712, which implements TX/RX transformers, creates a virtual TUN interface 716 and assigns an internal IP subnet to virtual TUN interface 716. When iperf TCP client 706 is launched and sending TCP packets to a virtual IP address within the subnet of TUN interface 716, the TUN/TAP daemon 712 will receive those packets and its TX transformer will convert their MAC, IP, or ICMP headers according to any of the layer 2, layer 3, or layer 4 approaches described above. Then the transformed egress packets are sent to the real target device, physical interface 714, using RAW socket system calls 707. When the target device echoes back the packets, the TUN/TAP daemon 712 intercepts them and converts their MAC and IP headers to have destination address as the address of the virtual interface and source address as the virtual IP address used by iperf TCP client 706. After the converted ingress packets are written into the virtual interface 716, they will be passed to TCP/IP stack 710 and handed over to iperf TCP server 708.

The eBPF and TUN/TAP approaches can require system privilege to inject eBPF code or create a TUN/TAP interface, which may not be possible for an application running on some devices, such as an app on a mobile device. In at least one embodiment, a user-mode TCP/IP stack can be used to implement the layer 4 (L4) approach (TCP over ICMP) method without requiring special system-level privilege and an ICMP socket API is needed. An example of a user-mode TCP/IP stack solution is demonstrated in FIG. 8.

Figure 8:
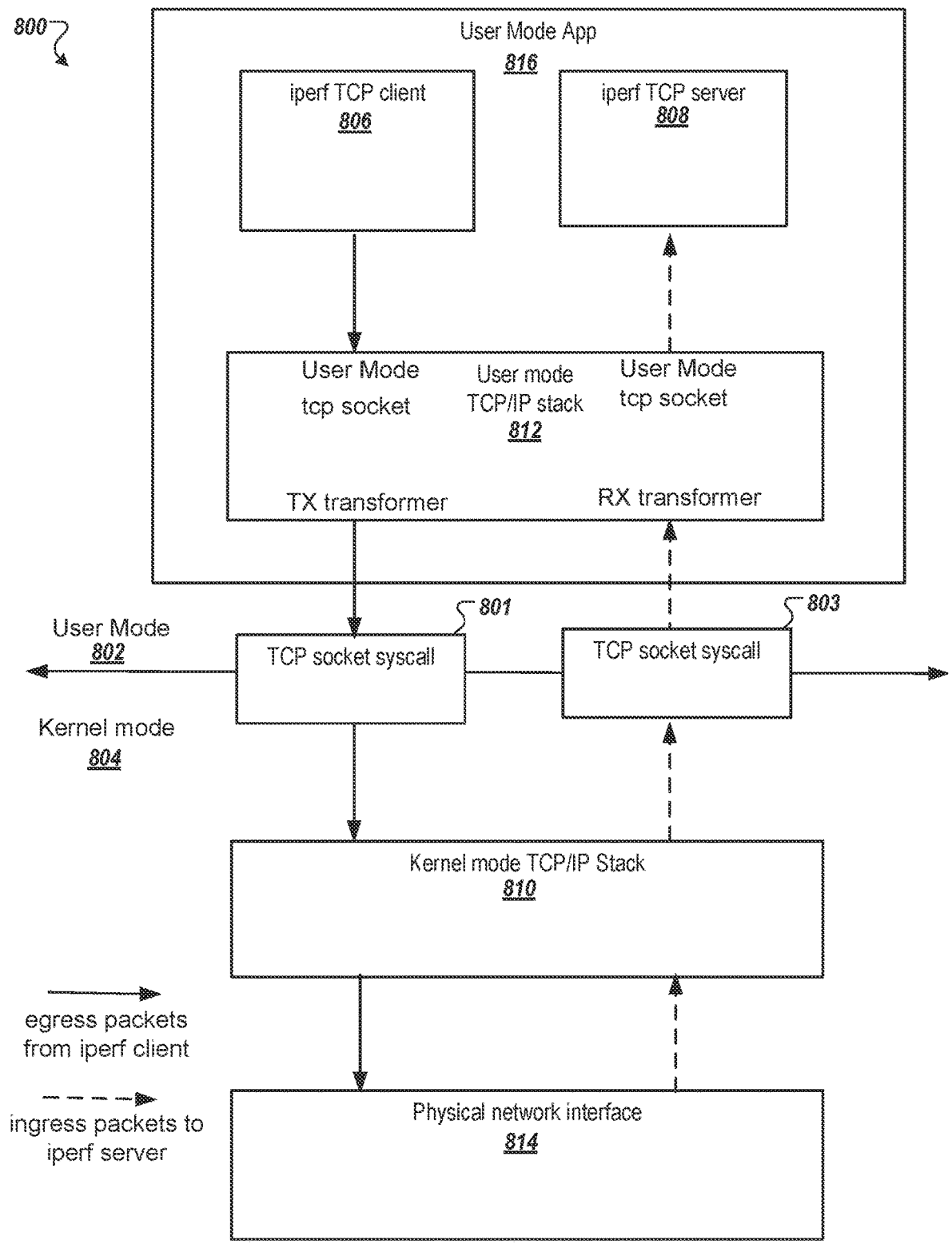
FIG. 8 is a block diagram of a user-mode Transport Control Protocol/Internet Protocol (TCP/IP) stack-based TX/RX transformer according to one embodiment.

FIG. 8 is a block diagram of a user-mode TCP/IP based TX/RX transformer 800 according to one embodiment. Inside a user-mode app 816, there is a user-mode TCP/IP stack 812. The app's internal iperf TCP client 806 calls user-mode TCP socket API to send packets to the user-mode TCP/IP stack 812, and the internal iperf TCP server 808 calls the same API to receive those packets. The TX/RX transformers in user-mode TCP/IP stack 812 are working as virtual network interfaces to convert the egress/ingress TCP/IP packets to/from ICMP packets. The app only needs unprivileged DATAGRAM ICMP socket API to send and receive ICMP packets through TCP socket system calls 801, 8013, respectively to kernel mode TCP/IP stack 810 and to or from a physical network interface 814. Then the internal iperf TCP client 860 can use the user-mode TCP/IP stack's congestion/flow control algorithm implementations to measure a value indicative of TCP throughput with any target devices.

Figure 9:
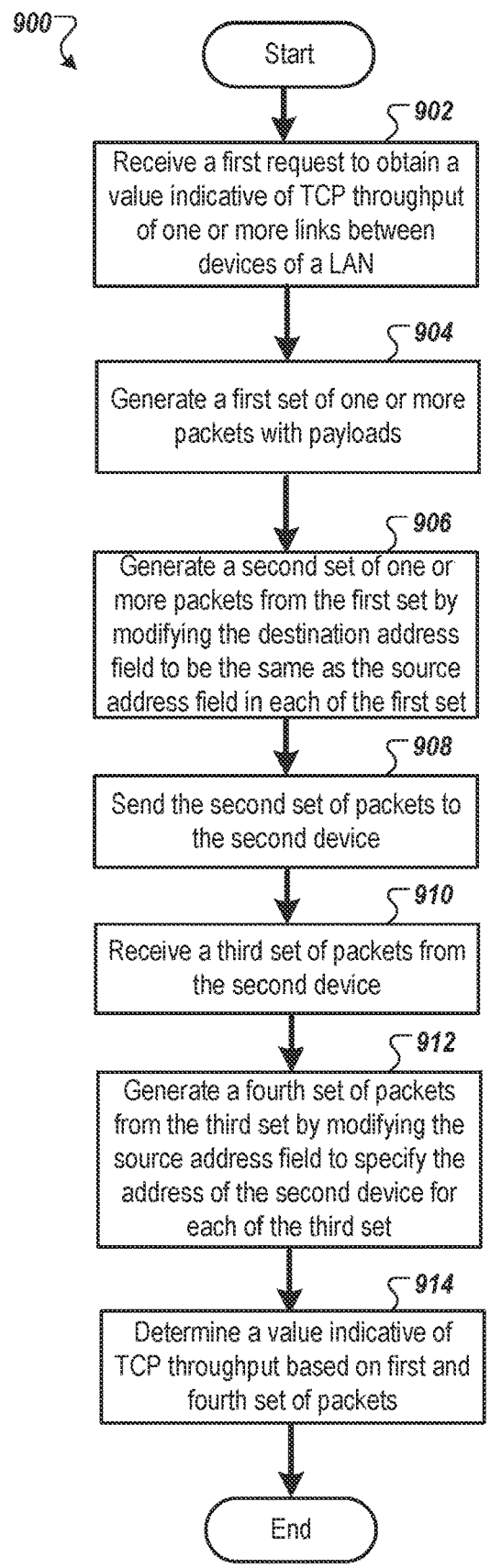
FIG. 9 is a flow diagram of a method of determining TCP throughput of a first communication link between a first device and a second device according to at least one embodiment.

FIG. 9 is a flow diagram of a method 900 of determining TCP throughput of a first path of one or more links between a first device and a second device according to at least one embodiment. Method 900 may be performed by processing logic that comprises hardware (e.g., circuitry, dedicated logic, programmable logic, microcode, etc.), software, firmware, or a combination thereof. In one embodiment, method 900 may be performed by single-ended TCP measurement tool 106 of FIGS. 1-2. In another embodiment, method 900 is performed by any wireless device described herein.

Referring back to FIG. 9, the processing logic receiving a request to obtain a value indicative of TCP throughput of one or more links between devices of the LAN (block 902). Processing logic generates a first set of one or more packets with payloads, the first set of packets specifying an address of the second device in a destination address field and an address of the first device in a source address field (block 904). Processing logic generates a second set of packets from the first set of packets by modifying data in the destination address field to be the same as the source address field in each of the first set of packets (block 906). Processing logic sends the second set of packets to the second device (block 908). Processing logic receives a third set of packets, responsive to the second set of packets, from the second device (block 910). Each of the third set of packets specifies the address of the first device in a destination address field and a source address field. Processing logic generates a fourth set of packets from the third set of packets by modifying data in the source address field to specify the address of the second device for each of the third set of packets (block 912). The fourth set of packets each includes the original payloads in the respective packet of the first set of packets. Processing logic determines a first value indicative of TCP throughput of a first link between a first device comprising the processing logic and a second device that is part of the LAN (block 914). The value can be determined based on data from sending the first set of packets and receiving the fourth set of packets.

In one embodiment, the second device is an AP device that is operatively coupled to a router device and the address of the first device and the address of the router device are MAC addresses. In this embodiment, the third set of packets at block 910 each specify an IP address of the router device in a destination IP address field and an IP address of the first device in a source IP address field. At block 912, processing logic generates the fourth set of packets by modifying data in the destination IP address field to specify the IP address of the first device and modifying data in the source IP address field to specify the IP address of the router device.

In another embodiment, processing logic determines a second value indicative of TCP throughput of the first link and a second link between the second device and a third device that is part of the LAN. Processing logic can determine the second value by generating a fifth set of one or more packets each with a second payload, the fifth set of packets specifying an address of the third device in a destination address field, and an address of the first device in a source address field. Processing logic generates a six set of packets from the fifth set of packets by modifying data in the destination address field to be the same as the source address field. Processing logic sends the sixth set of packets to the second device. Processing logic receives a seventh set of packets from the second device, responsive to the sixth set of packets. The seventh set of packets each specifies the address of the first device in a destination address field and a source address field. Processing logic generates an eighth set of packets from the seventh set by modifying data in the source address field to specify the address of the third device in each of the seventh set. The eighth set of packets each includes an original payload in the respective packet of the fifth set of packets. In one embodiment, the address of the first device and the address of the third device are IP addresses. Processing logic, in connection with generating the sixth data packet, calculates a checksum after modifying data in the destination address field. Processing logic, in connection with generating the eighth set of packets, calculates a checksum after modifying data in the source address field. In one embodiment, the second device is an AP device and the third device is an AP router device.

In another embodiment, processing logic determines a third value indicative of TCP throughput of a third link between the second device and a third device that is part of the LAN, such as a client device that is communicatively coupled to a common AP device. In at least one embodiment, processing logic generates a fifth set of one or more packets with a second payload, the fifth set of packets each specifying an address of the third device in a destination address field and an address of the first device in a source address field. Processing logic generates a sixth set of packets from the fifth set of packets by i) inserting an ICMP header between an IP header and a TCP header of the fifth data packet, the ICMP header comprising an echo request, ii) changing an IP protocol type to ICMP from TCP, and iii) calculating a checksum for the IP header after inserting the ICMP header and changing the IP protocol type to ICMP from TCP. Processing logic sends the sixth set of packets to the second device. In response, processing logic receives a seventh set of packets from the second device, the seventh data packet comprising the original payloads and the TCP header. Processing logic generates an eighth set of packets from the seventh set of packets by iv) removing the ICMP header, v) changing the IP protocol type to TCP from ICMP, and vi) calculating a checksum for the IP header after removing the ICMP header and changing the IP protocol type to TCP from ICMP. In one embodiment, the second device is an AP device and the third device is an endpoint device. Alternatively, the second device is an AP device and the third device is an AP device, an AP router device, or the like.

In another embodiment, instead of moving memory of TCP payload to remove ICMP header, the ICMP header can be replaced with an IP header option (8-byte IP header option) to become part of the IP header. In at least one embodiment, processing logic determines a third value indicative of TCP throughput of a third link between the second device and a third device that is part of the LAN by generating a fifth set of one or more packets with a second payload, the fifth set of packets each specifying an address of the third device in a destination address field and an address of the first device in a source address field. Processing logic generates a sixth set of packets from the fifth set by i) inserting an ICMP header between an IP header and a TCP header of the fifth data packet, the ICMP header comprising an echo request, ii) changing an IP protocol type to ICMP from TCP, and iii) calculating a checksum for the IP header after inserting the ICMP header and changing the IP protocol type to ICMP from TCP. Processing logic sends the sixth set of packets to the second device. In response, processing logic receives a seventh set of packets from the second device. The seventh data packets include the original payloads and the TCP header. The processing logic generates an eighth set of packets from the seventh set by iv) replacing the ICMP header with an IP header option to be part of the IP header, v) changing the IP protocol type to TCP from ICMP, and vi) calculating a checksum for the IP header after replacing the ICMP header and changing the IP protocol type to TCP from ICMP.

In another embodiment, the address of the first device and the address of the second device are MAC addresses and the processing logic generates the second set of packets by modifying data in the destination address field to include a MAC address of the first device.

An embodiment described above processing logic causes the iperf TCP client to think it is connected with the iperf TCP server on the second device when in actuality the iperf TCP client communicates with the iperf TCP server on the same device. In other embodiments, processing logic causes the iperf TCP server to think it has accepted a connection from the iperf TCP client on the second device when in actuality the iperf TCP server communicates with the iperf TCP client on the same device.

In another embodiment, processing logic determines the first value by performing the operations described above as well as the following operations. The processing logic generates a fifth set of packets with a payload, the fifth data packet specifying the address of the second device in a destination address field and the address of the first device in a source address field. Processing logic generates a sixth set from the first set by modifying data in the destination address field to be the same as the source address field and sending the sixth set of packets to the second device. In response, processing logic receives a seventh set of packets from the second device. The seventh set of packets each specifies the address of the first device in a destination address field and a source address field. Processing logic generates an eighth set of packets from the seventh by modifying data in the source address field to specify the address of the second device in each of the seventh set. The fourth data packet includes the original payloads from the fifth set. In one embodiment, the second device is an AP device that is operatively coupled to a router device and the address of the first device and the address of the router device are MAC addresses. The seventh set of packets each specify an IP address of the router device in a destination IP address field and an IP address of the first device in a source IP address field. Processing logic generates the eighth set of packets by modifying data in the destination IP address field to specify the IP address of the first device and modifying data in the source IP address field to specify the IP address of the router device.

In one embodiment, the wireless devices can be AP devices. In another embodiment, the wireless devices can be mesh stations (STAs). Alternatively, other combinations of wireless devices can be used.

Figure 10:
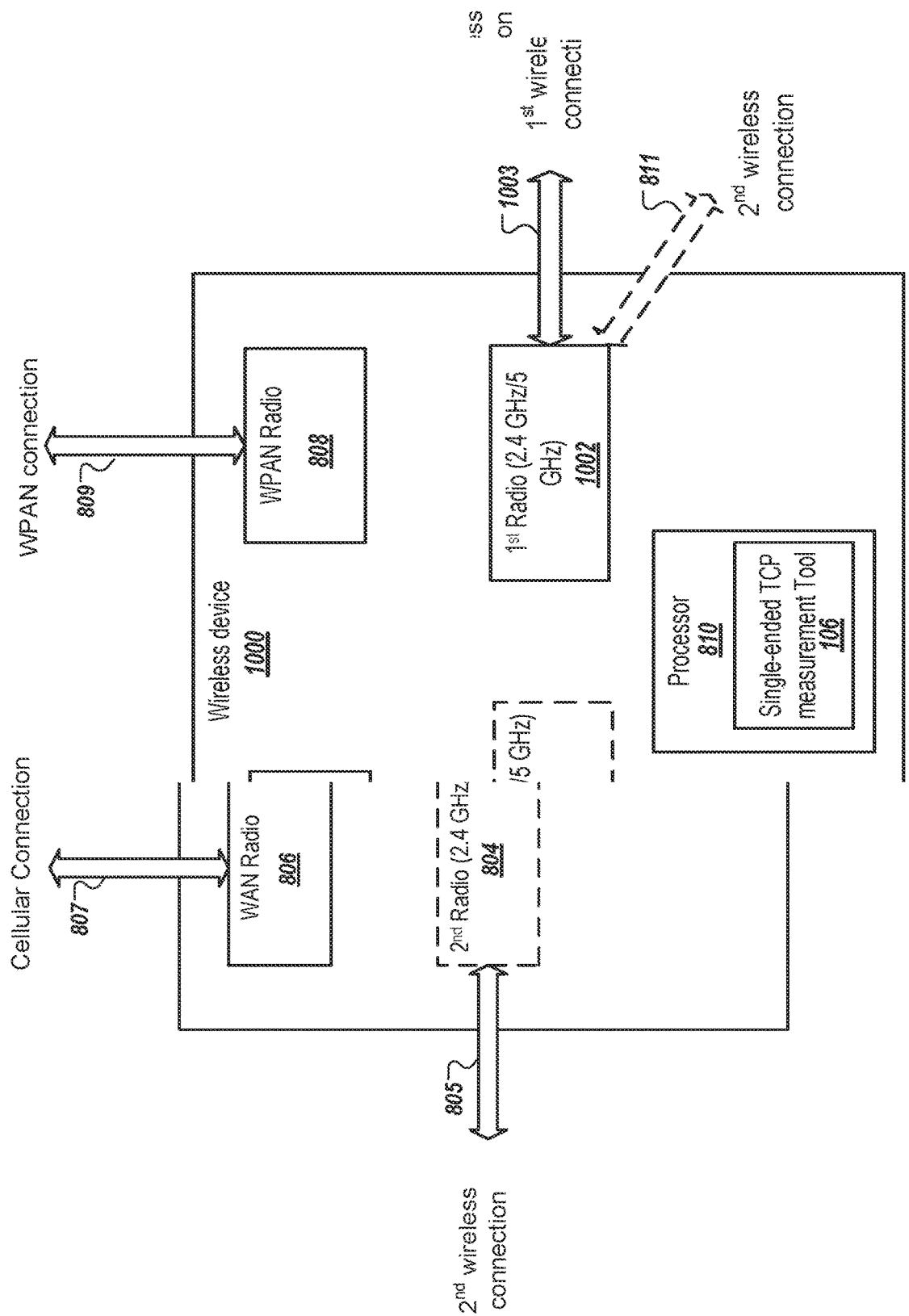
FIG. 10 is a block diagram of a wireless device with multiple radios according to one embodiment.

FIG. 10 is a block diagram of a wireless device 1000 with multiple radios according to one embodiment. The wireless device 1000 includes a first dual-band radio 1002, a second dual-band radio 1004, an optional cellular radio 1006, an optional wireless personal area network (WPAN) radio 1008, and a processor 1010. The processor 1010 can be any type of processing device that can implement operations associated with single-ended TCP measurement tool 106, such as described above with respect to FIGS. 1-9. The first dual-band radio 1002 creates a first wireless connection 1003 between the wireless device 1000 and a second wireless device, such as a router or a gateway in a first network. The second dual-band radio 1004 creates a second wireless connection 1005 between the wireless device 1000 and an endpoint device in a second network. The second wireless connection 1005 can be a peer-to-peer wireless connection or peer-to-multiple-peers wireless connections. The optional cellular radio 1006 creates a cellular connection between the wireless device 1000 and a device in a cellular network (not illustrated). The optional WPAN radio 1008 can create a wireless connection between the wireless device 1000 and a device in a WPAN. The WPAN radio 1008 can be a radio that implements the Bluetooth® technology, ZigBee® technology, Zwave® technology, or the like.

In another embodiment, the wireless device 1000 includes a single radio, such as the first radio that establishes the first wireless connection 1003 between the wireless device 1000 and a second wireless device, such as a router or a gateway in a first network. The same first radio establishes a second wireless connection 1011 between the wireless device 1000 and an endpoint device in a second network. The single radio can include an ability to create a soft AP using the same radio as being used for the first wireless connection 1003. Single-ended TCP measurement tool 106 can be implemented in a wireless device with a single radio.

In some embodiments, the wireless connections are WLAN connections that operate in a first frequency range (e.g., 2.4 GHz frequency band) or a second frequency range (e.g., any of the 5 GHz frequency bands).

In various embodiments, the wireless device 1000 may include memory, storage, one or more wired communication interfaces, two or more wireless communication interfaces, one or more processing devices, or the like. The communication interface, which may include one or more network devices for connecting to the Internet, may be adapted to also wirelessly couple the wireless device 1000 to one or more network devices of a first network (e.g., a first AP). The processor 1010 can process various data including, for example, topology information, such as node location, historical interference event data (e.g., which devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple wireless devices communicate. The data may further include information associated with, or useable to determine, pattern recognition and learning associated with radar event detection, data bandwidth requirements, and latency requirements, and the like. The data may also include scan lists, proximity data, dynamic frequency selection (DFS) channels, requirement sets, or the like as described above with respect to FIG. 1-7.

In embodiments, the wireless device 1000 includes a memory device that stores data, which are related to channels of the wireless devices and associated with topology information, channel congestion data, historical interference event data, historical application-based requirements information (e.g., historical application-based throughput and latency requirements), and per-channel antenna configurations. The memory device can also store data to be used for single-ended TCP measurement tool 106. The wireless device 1000 can communicate with other devices on a network. The network may be representative of an Internet or WAN connection. Such an Internet or WAN connection may include additional links or trunks, whether wired or wireless, that may involve other types of wideband communication, including those based on cellular standard(s). In various embodiments, the processor 1010 can include one or more modules, such as a single-ended TCP measurement module, or the like.

In at least one embodiment, wireless device 1000 is a wireless access point (WAP) device, including a WLAN radio and a processor, such as a processor 1010. Processor 1010 is configured to receive first data from a second WAP device. In at least one embodiment, wireless device 1000 is a mesh station (STA) device, including a WLAN radio and a processor, such as processor 1010. In at least one embodiment, wireless device 1000 is an endpoint device or a client device. The endpoint device can be a computer, a smartphone, a voice-controlled device, a wireless display, a wireless speaker, a game console, a wireless gamepad, or the like.

Figure 11:
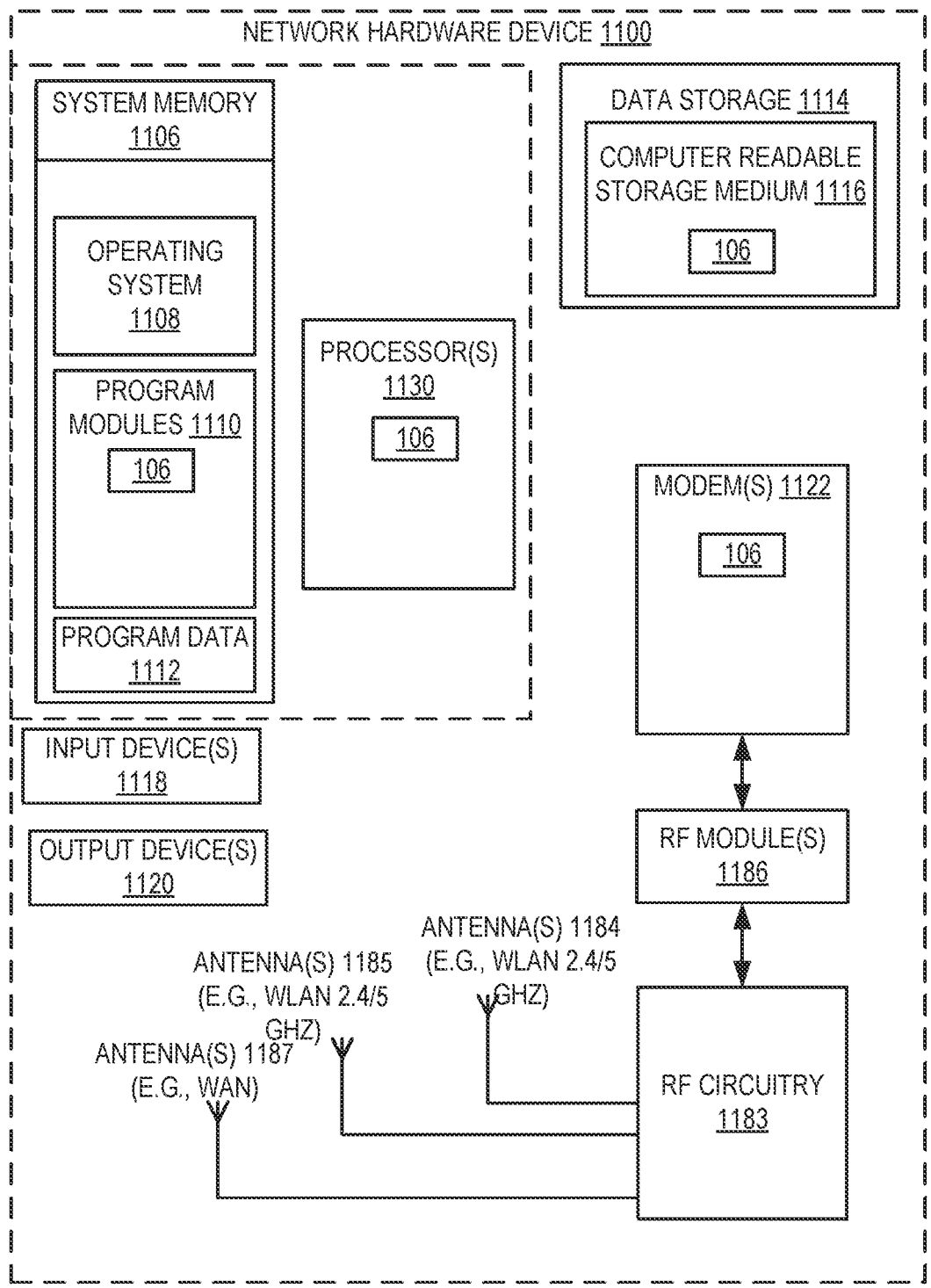
FIG. 11 is a block diagram of a wireless device for measuring TCP throughput in a wireless network according to one embodiment.

FIG. 11 is a block diagram of a wireless device 1100 for measuring TCP throughput in a wireless network according to one embodiment. The wireless device 1100 may correspond to the mesh network devices described above with respect to FIGS. 1-10. Alternatively, the wireless device 1100 may be other electronic devices, as described herein.

The wireless device 1100 includes one or more processor(s) 1130, such as one or more CPUs, microcontrollers, field-programmable gate arrays, or other types of processors. The wireless device 1100 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of methods to control the operation of the wireless device 1100. The wireless device 1100 performs functions by using the processor(s) 1130 to execute instructions provided by the system memory 1106. In one embodiment, the program modules 1110 may include single-ended TCP measurement tool 106. Single-ended TCP measurement tool 106 may perform some of the operations of reducing medium access contention described herein.

The wireless device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 (e.g., single-ended TCP measurement tool 106) may reside, completely or at least partially, within the computer-readable storage medium 1116, system memory 1106, and/or within the processor(s) 1130 during execution thereof by the wireless device 1100, the system memory 1106 and the processor(s) 1130 also constituting computer-readable media. The wireless device 1100 may also include one or more input devices 1118 (keyboard, mouse device, specialized selection keys, etc.) and one or more output devices 1120 (displays, printers, audio output mechanisms, etc.).

The wireless device 1100 further includes a modem 1122 to allow the wireless device 1100 to communicate via wireless connections (e.g., such as provided by the wireless communication system) with other computing devices, such as remote computers, an item providing system, and so forth. The modem 1122 can be connected to one or more radio frequency (RF) modules 1186. The RF modules 1186 may be a WLAN module, a WAN module, PAN module, GPS module, or the like. The antenna structures (antenna(s) 1184, 1185, 1187) are coupled to the RF circuitry 1183, which is coupled to the modem 1122. The RF circuitry 1183 may include radio front-end circuitry, antenna switching circuitry, impedance matching circuitry, or the like. The antennas 1184 may be GPS antennas, NFC antennas, other WAN antennas, WLAN or PAN antennas, or the like. The modem 1122 allows the wireless device 1100 to handle both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 1122 may generate signals and send these signals to the antenna(s) 1184 of a first type (e.g., WLAN 5 GHz), antenna(s) 1185 of a second type (e.g., WLAN 2.4 GHz), and/or antenna(s) 1187 of a third type (e.g., WAN), via RF circuitry 1183, and RF module(s) 1186 as described herein. Antennas 1184, 1185, 1187 may be configured to transmit in different frequency bands and/or using different wireless communication protocols. The antennas 1184, 1185, 1187 may be directional, omnidirectional, or non-directional antennas. In addition to sending data, antennas 1184, 1185, 1187 may also receive data, which is sent to appropriate RF modules connected to the antennas. One of the antennas 1184, 1185, 1187 may be any combination of the antenna structures described herein.

In one embodiment, the wireless device 1100 establishes a first connection using a first wireless communication protocol, and a second connection using a different wireless communication protocol. The first wireless connection and second wireless connection may be active concurrently, for example, if a wireless device is receiving a media item from another wireless device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1122 is shown to control transmission and reception via the antenna (1184, 1185, 1187), the wireless device 1100 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
generating, by a first device that is part of a local area network (LAN), a first data packet with a payload, the first data packet specifying a first media access control (MAC) address of a second device-in its destination address field and a second MAC address of the first device in its source address field, and the first data packet specifying an Internet Protocol (IP) address of the second device in its destination IP address field and an IP address of the first device in its source IP address field;
generating a second data packet from the first data packet by modifying the first MAC address in the destination address field to be the same as the second MAC in the source address field;
sending the second data packet to the second device;
receiving a third data packet from the second device, the third data packet specifying the address of the first device in its destination address field and its source address field and specifying the IP address of the second device in its destination IP address field and the IP address of the first device in its source IP address field;
generating a fourth data packet from the third data packet by modifying data in the source address field to specify the first MAC address of the second device, modifying data in the source IP address field to specify the second device, and modifying data in the destination IP address field to specify the first device, the fourth data packet comprising the payload; and
determining, by the first device, a first value indicative of a transport control protocol (TCP) throughput of a first communication link between the first device and the second device using timing information associated with sending the second data packet and receiving the third data packet.

2. The method of claim 1, wherein:
the second device is a router device operatively coupled to an access point (AP) device that is operatively coupled to the first device.

3. The method of claim 1, further comprising:
generating a fifth data packet with a second payload, the fifth data packet specifying an address of a third device in its destination address field and an address of the first device in its source address field;
generating a sixth data packet from the fifth data packet by modifying data in the destination address field to be the same as the source address field;
sending the sixth data packet to the second device;
receiving a seventh data packet from the second device, the seventh data packet specifying the address of the first device in its destination address field and its source address field; and
generating an eighth data packet from the seventh data packet by modifying data in the source address field to specify the address of the third device, the eighth data packet comprising the second payload,
determining, by the first device, a second value indicative of TCP throughput of a communication path comprising the first communication link and a second communication link between the second device and the third device.

4. The method of claim 3, wherein the address of the first device and the address of the third device are IP addresses, wherein generating the sixth data packet further comprises calculating a checksum after modifying data in the destination address field, and wherein generating the eighth data packet further comprises calculating a checksum after modifying data in the source address field.

5. The method of claim 3, wherein the second device is an access point (AP) device and the third device is a router device.

6. The method of claim 1, wherein determining the first value further comprises:
generating a fifth data packet with a payload, the fifth data packet specifying the address of the second device in its destination address field and the address of the first device in its source address field;
generating a sixth data packet from the fifth data packet by modifying data in the destination address field to be the same as the source address field;
sending the sixth data packet to the second device;
receiving a seventh data packet from the second device, the seventh data packet specifying the address of the first device in its destination address field and its source address field; and
generating an eighth data packet from the seventh data packet by modifying data in the source address field to specify the address of the second device, the fourth data packet comprising the payload.

7. The method of claim 6, wherein
the second device is an access point (AP) device that is operatively coupled to a router device.

8. A first wireless device comprising:
a radio; and
a processor coupled to the radio, wherein the processor executes instructions to perform operations comprising:
generating a first data packet with a payload, the first data packet specifying a first media access control (MAC) address of a second device-in its destination address field and a second MAC address of the first wireless device in its source address field, and the first data packet specifying an Internet Protocol (IP) address of the second device in its destination IP address field and an IP address of the first wireless device in its source IP address field;
generating a second data packet from the first data packet by modifying the first MAC address in the destination address field to be the same as the second MAC in the source address field;
sending the second data packet to the second device;
receiving a third data packet from the second device, the third data packet specifying the address of the first wireless device in its destination address field and its source address field and specifying the IP address of the second device in its destination IP address field and the IP address of the first wireless device in its source IP address field;

generating a fourth data packet from the third data packet by modifying data in the source address field to specify the first MAC address of the second device, modifying data in the source IP address field to specify the second device, and modifying data in the destination IP address field to specify the first wireless device, the fourth data packet comprising the payload; and determining a first value indicative of a transport control protocol (TCP) throughput of a first communication link between the first wireless device and the second device using timing information associated with sending the second data packet and receiving the third data packet.

9. The first wireless device of claim 8, wherein:
the second device is a router device operatively coupled to an access point (AP) device that is operatively coupled to the first wireless device.

10. The first wireless device of claim 8, wherein the processor executes instructions to perform operations further comprising:
generating a fifth data packet with a second payload, the fifth data packet specifying an address of a third device in its destination address field and an address of the first wireless device in its source address field;
generating a sixth data packet from the fifth data packet by modifying data in the destination address field to be the same as the source address field;
sending the sixth data packet to the second device;
receiving a seventh data packet from the second device, the seventh data packet specifying the address of the first wireless device in its destination address field and its source address field;
generating an eighth data packet from the seventh data packet by modifying data in the source address field to specify the address of the third device, the eighth data packet comprising the second payload; and
determining a second value indicative of TCP throughput of the first communication link and a second communication link between the second device and the third device.

11. The first wireless device of claim 10, wherein:
the address of the first wireless device and the address of the third device are IP addresses;
generating the sixth data packet further comprises calculating a checksum after modifying data in the destination address field; and
generating the eighth data packet further comprises calculating a checksum after modifying data in the source address field.

12. The first wireless device of claim 10, wherein the second device is an access point (AP) device and the third device is a router device.

13. The first wireless device of claim 8, wherein determining the first value further comprises:
generating a fifth data packet with a payload, the fifth data packet specifying the address of the second device in its destination address field and the address of the first wireless device in its source address field;
generating a sixth data packet from the fifth data packet by modifying data in the destination address field to be the same as the source address field;

sending the sixth data packet to the second device;
receiving a seventh data packet from the second device, the seventh data packet specifying the address of the first wireless device in its destination address field and its source address field; and
generating an eighth data packet from the seventh data packet by modifying data in the source address field to specify the address of the second device, the fourth data packet comprising the payload.

14. The first wireless device of claim 13, wherein
the second device is an access point (AP) device that is operatively coupled to a router device.

15. The first wireless device of claim 10, wherein:
the second device is a router device operatively coupled to an access point (AP) device that is operatively coupled to the first wireless device; and
there is a single communication link between the first wireless device and the AP device.

16. A first device comprising:
a memory to instructions; and
a processor operatively coupled to the memory, the processor to execute the instructions to perform operations comprising:
generating a first data packet with a payload, the first data packet specifying a first media access control (MAC) address of a second device-in its destination address field and a second MAC address of the first device in its source address field, and the first data packet specifying an Internet Protocol (IP) address of the second device in its destination IP address field and an IP address of the first device in its source IP address field;
generating a second data packet from the first data packet by modifying the first MAC address in the destination address field to be the same as the second MAC in the source address field;
sending the second data packet to the second device;
receiving a third data packet from the second device, the third data packet specifying the address of the first device in its destination address field and its source address field and specifying the IP address of the second device in its destination IP address field and the IP address of the first device in its source IP address field;
generating a fourth data packet from the third data packet by modifying data in the source address field to specify the first MAC address of the second device, modifying data in the source IP address field to specify the second device, and modifying data in the destination IP address field to specify the first device, the fourth data packet comprising the payload; and
determining, by the first device, a first value indicative of a transport control protocol (TCP) throughput of a first communication link between the first device and the second device using timing information associated with sending the second data packet and receiving the third data packet.

17. The first device of claim 16, wherein the second device is a router device operatively coupled to an access point (AP) device that is operatively coupled to the first device.

18. The first device of claim 16, wherein the operations further comprise:
generating a fifth data packet with a second payload, the fifth data packet specifying an address of a third device in its destination address field and an address of the first device in its source address field;

generating a sixth data packet from the fifth data packet by modifying data in the destination address field to be the same as the source address field;

sending the sixth data packet to the second device;

receiving a seventh data packet from the second device, the seventh data packet specifying the address of the first device in its destination address field and its source address field; and generating an eighth data packet from the seventh data packet by modifying data in the source address field to specify the address of the third device, the eighth data packet comprising the second payload, determining, by the first device, a second value indicative of TCP throughput of a communication path comprising the first communication link and a second communication link between the second device and the third device.

* * * * *